United States Patent [19]
Kunishige

[11] Patent Number: 5,949,478
[45] Date of Patent: *Sep. 7, 1999

[54] LOW COST FILM SCANNER CONTROLLING MONITOR DISPLAY AND READING OF FILM IMAGES AT HIGH SPEED

[75] Inventor: Keiji Kunishige, Hachioji, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,025

[22] Filed: Mar. 12, 1996

[30] Foreign Application Priority Data

Mar. 13, 1995 [JP] Japan ................................. 7-052268
Mar. 24, 1995 [JP] Japan ................................. 7-066254

[51] Int. Cl.$^6$ ........................ H04N 9/10; H04N 3/36
[52] U.S. Cl. ..................................... 348/96; 348/97
[58] Field of Search ............... 348/96, 97, 106–110, 348/111–112; 382/312, 321, 323; 360/79–80; 358/474; H04N 5/235, 3/36, 9/10, 9/11

[56] References Cited

U.S. PATENT DOCUMENTS

| | | | |
|---|---|---|---|
| 4,689,691 | 8/1987 | Isogai et al. | 348/97 |
| 4,903,131 | 2/1990 | Lingemann et al. | 348/97 |
| 4,920,419 | 4/1990 | Easterly | 348/97 |
| 4,934,821 | 6/1990 | Morton | 348/112 |
| 5,010,410 | 4/1991 | Bernstein | 348/97 |
| 5,146,321 | 9/1992 | Lees et al. | 348/96 |
| 5,164,831 | 11/1992 | Kutchta et al. | 348/97 |
| 5,321,500 | 6/1994 | Capitant et al. | 348/97 |
| 5,412,773 | 5/1995 | Carlucci et al. | 348/97 |
| 5,546,121 | 8/1996 | Gotanda et al. | 348/64 |
| 5,568,273 | 10/1996 | Sato et al. | 348/96 |

FOREIGN PATENT DOCUMENTS

| | | | |
|---|---|---|---|
| 05560442A2 | 8/1993 | European Pat. Off. | H04N 5/253 |
| 4-68877 | 3/1992 | Japan | H04N 5/253 |
| WO 86/07515 | 12/1986 | WIPO | H04N 5/253 |

OTHER PUBLICATIONS

Godden et al, "High Performance CCD Telecine for HDTV", IEEE, 1990.
"IBM Mainframes Architeture and Design", McGraw–Hill Book Company, N.S. Prasad, p. 15, c. 1989.

Primary Examiner—Vu Le
Attorney, Agent, or Firm—Louis Weinstein

[57] ABSTRACT

A film scanner enabling TV display includes a line sensor for converting a one-dimensional optical image into a line image signal. An A/D converter converts the line image signal into a digital signal. An image memory stores the digital signal in units of a line image. A D/A converter converts a line image signal read from the image memory into an analog signal. A sync signal generator generates a sync signal used to produce a video signal. An encoder outputs a given video signal on the basis of an analog signal output from the D/A converter and the sync signal. A control unit controls at least accumulation of the line sensor in response to the given timing of the sync signal, to control reading or writing of the image memory.

27 Claims, 22 Drawing Sheets

FIG.5

S500 OFLD (LEADING-EDGE) INTERRUPT PROCESSING

S501 SET OCCURRENCE OF TRAILING-EDGE INTERRUPT AS CONDITION, AND SPECIFY H(ODD) FOR ofld_flg

S502 SPECFIY 0 FOR ohd_cnt1 AND 0 FOR ohd_cnt2

S503 IRET

FIG.6

S504 OFLD (TRAILING-EDGE) INTERRUPT PROCESSING

S505 SET OCCURRENCE OF LEADING-EDGE INTERRUPT AS CONDITION, AND SPECIFY L(EVEN) FOR ofld_flg

S506 IRET

LOW COST FILM SCANNER CONTROLLING MONITOR DISPLAY AND READING OF FILM IMAGES AT HIGH SPEED

BACKGROUND OF THE INVENTION

1. Field of the Invention

The present invention relates to a film scanner for reading an image from film and outputting corresponding image data.

2. Description of the Related Art

In the past, various types of film scanners capable of reading an image from film and outputting a video signal (composite video signal, Y-C signal, or the like) of read data have been known. For example, Japanese Patent Laid-Open No. 4-68877 has disclosed an example of a film scanner. A film scanner represented by the disclosed technological means will be described below with reference to FIG. 23. As illustrated, the film scanner includes a CCD control circuit composed of an image sensor 101 such as a CCD for reading an image from film, an A/D converter 102 for converting an image signal read by the image sensor 101 into digital data, and a digital signal processing unit 103a for performing various kinds of signal processing on the digital data and outputting the processed data to a personal computer or the like.

The film scanner further includes a TV display control circuit composed of a frame memory 103b for storing a digital signal processed by the digital signal processing unit 103, a memory control unit 106 for controlling the frame memory 103b, a high-definition TV synchronizing (hereinafter sync) signal generating unit 107, and a D/A converting circuit 104 for reading data stored in the frame memory 103b, converting the data into an analog signal, and outputting a video signal, which can be input to a TV, with a sync signal appended.

As mentioned above, the film scanner has two control units; the CCD control circuit and TV display control circuit.

However, since the two control units (CCD control circuit and TV display control circuit) of the foregoing film scanner are control units in which very fast processing is essential, timing control requires a highly advanced technology.

For example, unless the timing of discharging image data from the frame memory for TV display is precisely synchronous with a horizontal TV sync signal (or blanking signal), jitters occur in a TV display screen. Thus, the TV display screen suffers low definition.

Moreover, unless exposure time control for a CCD is managed reliably, a produced image suffers irregular luminance. This also results in a TV display screen of low definition.

Furthermore, since the two kinds of control are very fast, a single controller cannot perform the respective processing. As mentioned above, therefore, independent control circuits are usually included. That is to say, independent control hardware devices are included. This poses a problem of high hardware cost. Moreover, since the relative timing of the independent hardware devices must be adjusted, there is a possibility that their control sequences may get complicated.

OBJECTS AND SUMMARY OF THE INVENTION

The first object of the present invention is to provide a film scanner capable of achieving monitor display and reading film images despite the very simple and inexpensive configuration.

The second object of the present invention is to provide a film scanner capable of achieving monitor display and reading film images despite employment of a single controller.

The third object of the present invention is to provide a film scanner capable of achieving monitor display and reading film images despite the simple hardware and software configurations.

Briefly, a film scanner of the present invention comprises:

a line sensor means for converting a one-dimensional optical image into a line image signal;

an A/D converting means for converting the line image signal into a digital signal;

an image memory means for storing the digital signal in units of a line image;

a D/A converting means for converting a line image signal read from the image memory means into an analog signal;

a sync signal generating means for generating a sync signal used to produce a video signal;

an encoder means for outputting a given video signal on the basis of an analog signal output from the D/A converting means and the sync signal; and a control means for controlling at least accumulating of the line sensor means in response to the given timing of the sync signal and controlling reading or writing of the image memory means.

These objects and advantages of the present invention will become further apparent from the following detailed explanation.

BRIEF DESCRIPTION OF THE DRAWINGS

FIG. 5 is a flowchart describing a subroutine for processing a leading-edge interrupt of an even/odd field signal OFLD in the film scanner of the first embodiment;

FIG. 6 is a flowchart describing a subroutine for processing a trailing-edge interrupt of an even/odd field signal OFLD in the the film scanner of the first embodiment;

DETAILED DESCRIPTION OF THE PREFERRED EMBODIMENTS

Figure 1:
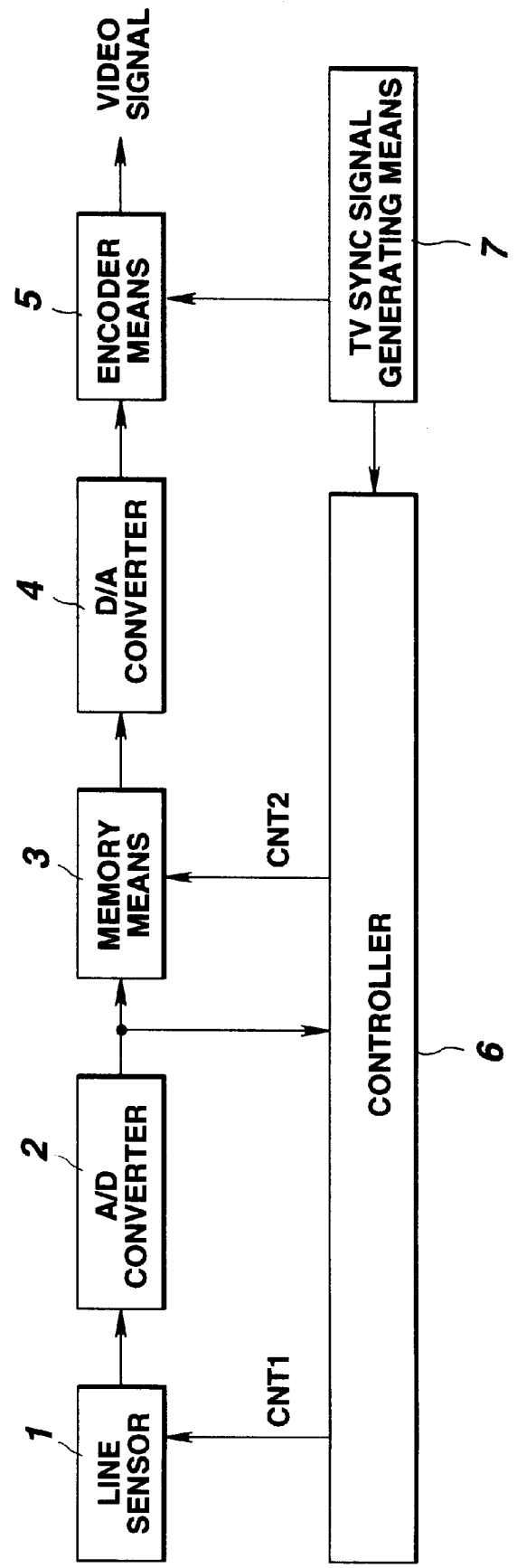
FIG. 1 is a block diagram showing the configuration of a major section of a film scanner of the first embodiment of the present invention.

Referring to the drawings, embodiments of the present invention will be described below.

FIG. 1 is a block diagram showing the outline of the first embodiment of the present invention. A film scanner of this embodiment comprises a line sensor 1 whose accumulating time and reading are controlled by a controller 6, an A/D converter 2 for converting an analog image signal sent from the line sensor 1 into a digital signal, a memory means 3 for storing an output of the A/D converter 2, a D/A converter 4 for converting an output of the memory means 3 into an analog signal, an encoder means 5 for receiving an output of the D/A converter 4 and outputting a video signal that can be input to a TV system, and a controller 6 for controlling the operations of the scanner synchronously with an output of a TV sync signal generating means 7.

The controller 6, which is a single integrated control means, is requested to perform such fast processing as accumulating time control for a sensor, reading control, data output control, shading correction, aperture correction, or negative-positive reversal. When a high-speed microcomputer, for example, a reduced instruction set computer type microcomputer (hereinafter RISC microcomputer) is employed in signal processing synchronous with a horizontal TV sync signal, fast processing can be achieved.

A microcomputer employed in the controller 6 is not limited to the RISC microcomputer, but may be a complex instruction set computer type microcomputer (hereinafter CISC microcomputer) that has been used in the past, as long as fast processing can be achieved. A gate array or the like that is customized in compliance with unique specifications will also do.

Figure 2:
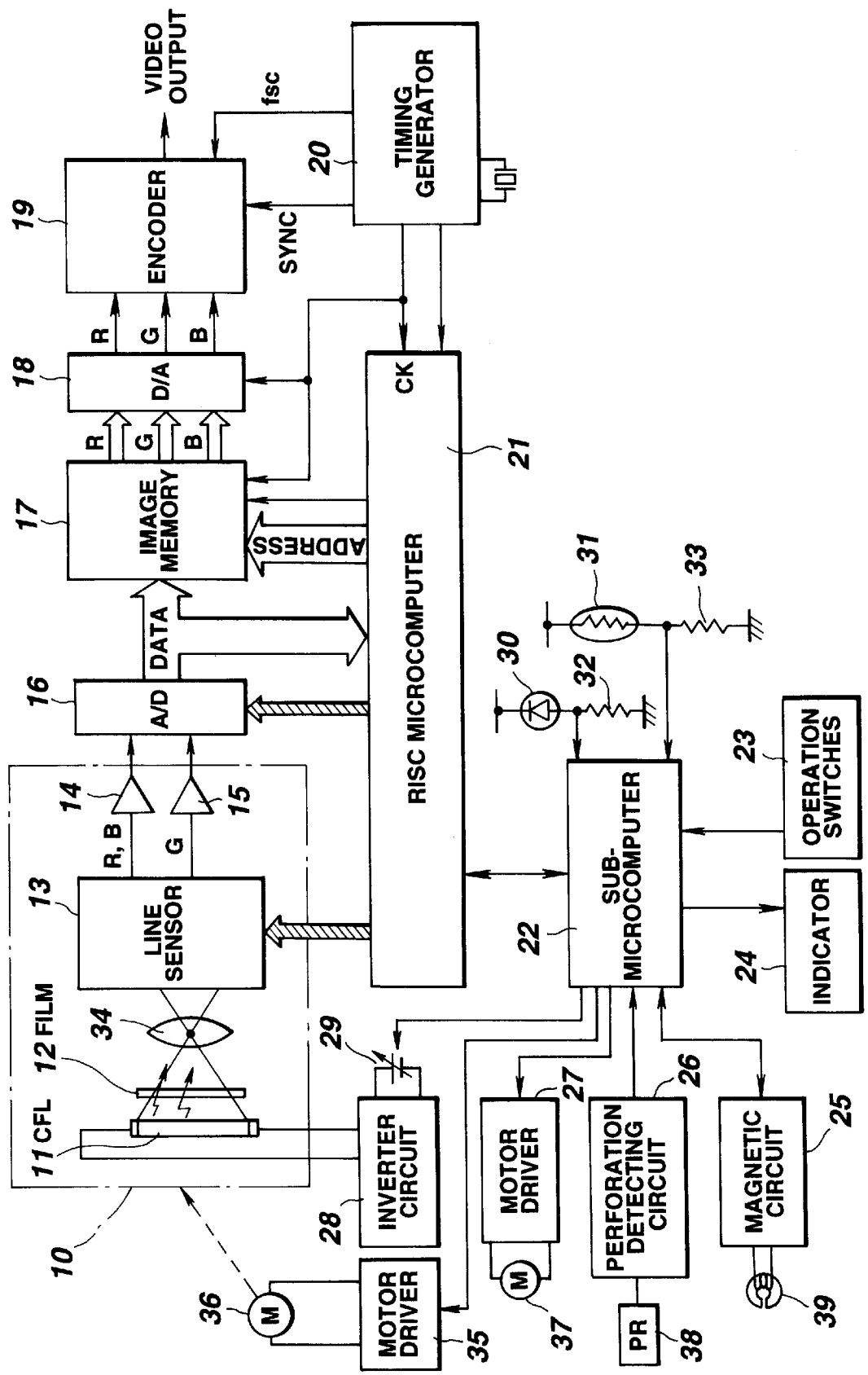
FIG. 2 is a block diagram showing in more detail the configuration of the film scanner of the first embodiment.

FIG. 2 is a block diagram showing in more detail the configuration of the film scanner of the first embodiment. This film scanner is configured so that a RISC microcomputer 21 capable of performing fast processing and a sub-microcomputer 22 for extending input and output functions can control the entire scanner. A sub-scan block 10 for scanning the film 12 two-dimensionally using the line sensor is composed of a cold-cathode discharge lamp (hereinafter CFL) 11 serving as a light source means for illuminating image input film, a reduced image formation optical system 34 opposed to the light source 11 with the film 12 between them, a line sensor 13 capable of outputting signals of two systems; a system for outputting a red (hereinafter R) signal and blue (hereinafter B) signal alternately and a system for outputting a green (hereinafter G) signal, video amplifiers 14 and 15 connected to the output terminals of the two systems of the line sensor 13, and a stepping motor 36.

A video signal output system is composed of an A/D converter 16 that receives analog outputs of the video amplifiers 14 and 15, an image memory 17 for saving converted digital image data, a D/A converter 18 for converting digital image data read from the image memory 17 into an analog signal, an encoder 19 for outputting a video signal, a timing generator 20 for generating a sync signal used by the encoder 19 and a clock used by a RISC microcomputer, and a RISC microcomputer 21 for controlling the line sensor 13, A/D converter 16, and image memory 17 in a centralized manner.

The sub-microcomputer 22 is connected to the RISC microcomputer so that the sub-microcomputer 22 can communicate with the RISC microcomputer, whereby the sub-microcomputer 22 can control: a motor driver 27 for driving a film feed motor 37, an inverter circuit 28 for generating a high voltage so as to light the light source 11, and a motor driver 35 for driving a sub-scan block drive motor 36 in response to an output of a light receiving device 30 for monitoring luminance of the light source 11, an output of a temperature sensor 31 for sensing ambient temperature, states of operation switches 23 for use in operating the film scanner, an output of a perforation detecting circuit 26 for controlling feed of the film 12, and an output of a magnetic circuit 25 for reading data magnetically recorded on the film 12 respectively.

Aside from the CFL, the light source 11 may be such a light source means as a light-emitting diode (LED), hot-cathode discharge lamp, halogen lamp, or xenon lamp. The inverter circuit 28 inputs a voltage of substantially 12 V from a direct-current (hereinafter DC) power supply 29, and outputs a voltage whose frequency is 50 kHz and whose peak to peak voltage is 750 Vp-p as alternating-current power necessary for the CFL. The DC power supply 29 is controlled by the sub-microcomputer 22 so that an output thereof can be varied, whereby the luminance of the CFL is set. A linearly-illuminated portion of the film 12 is reduced by an image-formation lens 34 so that the portion will have a size corresponding to a product of the original size by approximately 0.8. An image is then formed on the line sensor 13. The reduction ratio is determined properly according to the specifications for a light receiving unit of the line sensor or the conditions for optical design of the periphery of an image reading unit.

The line sensor in this embodiment is formed with a charge-coupled device (hereinafter CCD) type line sensor having two detection lines on each of which the number of effective pixels is 1024. One of the lines is dedicated to a G signal, and the other line outputs an R signal and a B signal alternately. The R and B signals are amplified by the video amplifier 14, and the G signal is amplified by the video amplifier 15. The amplified signals are input to the A/D converter 16.

Sub-scan of the film 12 in the sub-scan block 10 is achieved by driving the stepping motor 36 under the control of the sub-microcomputer 22. The sub-microcomputer 22 communicates with the RISC microcomputer 21 so as to report start or end of a sub-scan movement to be made in given steps. With this communication, the RISC microcomputer 21 judges whether data read from the line sensor 13 is valid or invalid. When judging that the data is valid, the RISC microcomputer 21 performs signal processing and saves resultant data in the image memory 17. Placing or fetching image data in or out of the image memory 17 by the RISC microcomputer is executed by a direct memory access (hereinafter DMA) unit, which is not shown, incorporated in the RISC microcomputer. Thus, fast data transfer is accomplished.

Image data saved in the image memory 17 is transferred from a dynamic access memory (hereinafter DRAM), which is not shown, incorporated in the image memory 17 into a serial-access memory (hereinafter SAM), which is not shown, synchronously with a sync signal sent from the timing generator 20. The image data is then sent consecutively to the D/A converter 18 synchronously with a clock sent from the timing generator 20, converted into a video signal by the encoder 19, and then outputted as a video signal.

Frame-by-frame feed of the film 12 is achieved by driving the film feed motor 37 using the motor driver 27 under the control of the sub-microcomputer 22. At this time, a photo-reflector (PR) 38 detects the number of frames or a frame position using the perforation detecting circuit 26. Moreover, magnetic data such as photography information recorded magnetically on the film 12 is read by a magnetic head 39 and fetched into the sub-microcomputer 22 via the magnetic circuit 25. For writing magnetic data on the film 12, the magnetic head 39 is also used.

The sub-microcomputer 22 not only provides the aforesaid control but also converts an output of the light receiving device 30 into a digital form so as to monitor the luminance of the light source 11. Moreover, the sub-microcomputer 22 controls the inverter circuit 28 in terms of voltage (of voltage source 29) so that the light source 11 will have a certain luminance, and transmits the light-source luminance information to the RISC microcomputer 21 so that the information can be utilized for controlling the accumulating time of the line sensor 13 or judging the validity of sensor data. In addition, the sub-microcomputer 22 converts an output of a temperature sensor 31 into a digital form, and transmits the resultant output to the RISC microcomputer 21. Based on the temperature information, the RISC microcomputer 21 performs color conversion so as to correct a change in chromaticity of the light source 11 by, for example, referencing a table.

Furthermore, the sub-microcomputer 22 inputs states of the operation switches 23 of the film scanner, uses an indicator 24 to provide an indication according to the states, and transmits an input instruction as a system flag to the RISC microcomputer 21. As mentioned above, as for processing not required to be fast, the sub-microcomputer 22 that is an ordinary small-scale CISC microcomputer is responsible for control of the processing.

Figure 3:
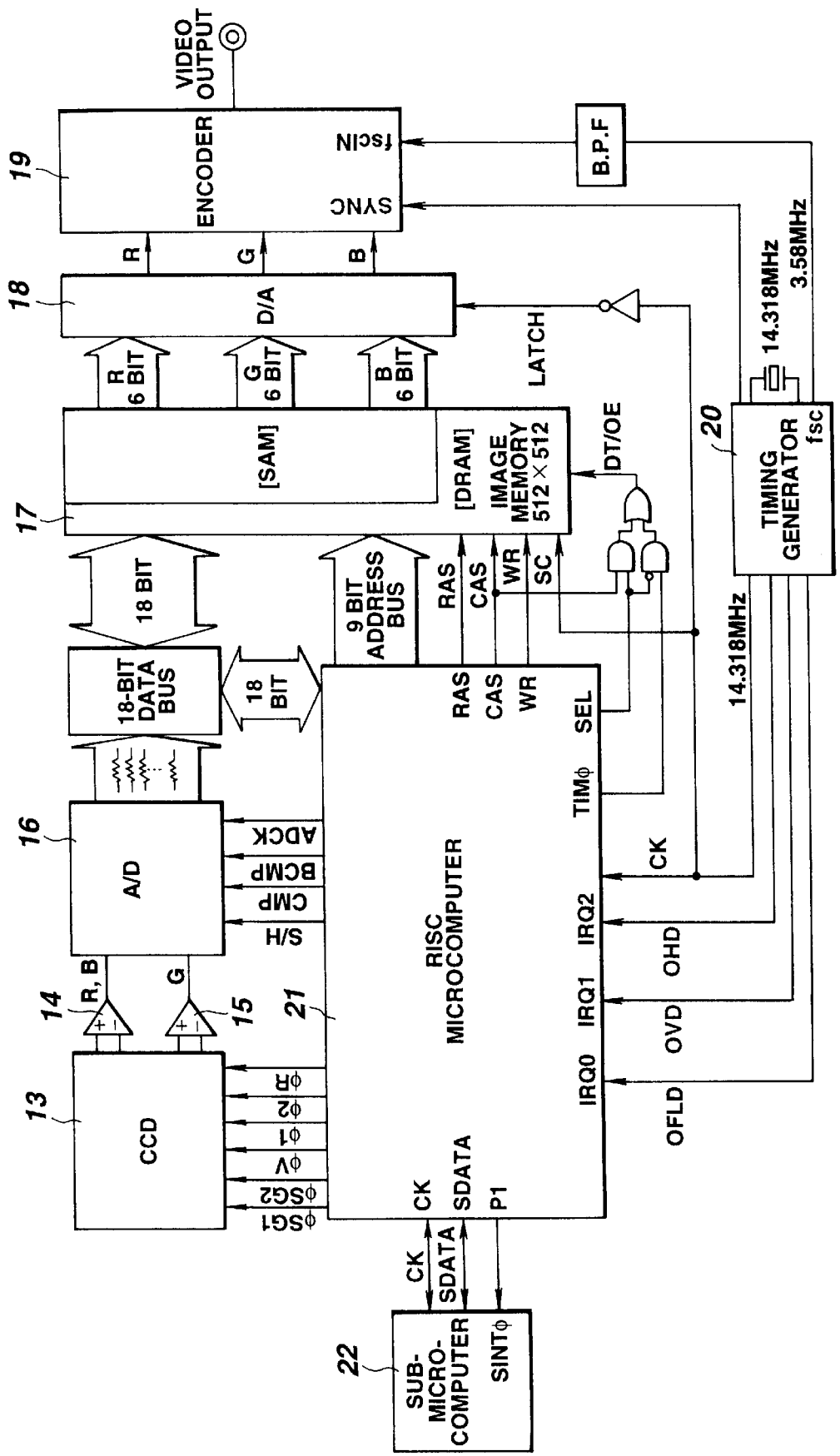
FIG. 3 is an electrical circuit diagram showing in more detail a main control circuit and its peripheral circuits in the film scanner of the first embodiment.

FIG. 3 is a block diagram showing in more detail the video signal system in the first embodiment shown in FIG. 2. The line sensor 13 and A/D converter 16 are controlled by the RISC microcomputer 21 over six signal lines and four signal lines respectively. A digital data bus has a width permitting transfer of 18 bits, and enjoys the resolution of 6 bits for R, G, or B data.

The image memory 17 is a memory formed mainly with a DRAM holding 18-bit data at 9-bit addresses. A dedicated output port of the image memory 17 includes the SAM. The image memory 17 is controlled by the RISC microcomputer 21 over 5 signal lines. Depending on the setting of an output port SEL of the RISC microcomputer 21, a CAS signal or TIM signal is selectively sent over one of control lines, DT/OE.

The D/A converter 18 receives as inputs R, G, and B data, each of which is 6 bits long, from the SAM in the image memory 17, and converts the fetched data into R, G, and B analog signals respectively in response to a latch signal based on a clock sent from the timing generator 20.

The encoder 19 inputs the R, G, and B analog signals, a sync signal fsc sent from the timing generator 20 via a bandpass filter (BPF) having given characteristics, and a composite sync signal SYNC, and outputs a video signal.

The timing generator 20 generates at least six kinds of pulsating sync signals; that is, a fundamental frequency of 14.318 MHz, a sync signal fsc of 3.58 MHz, a composite signal SYNC, an even/odd field signal OFLD, a vertical sync signal OVD, and a horizontal sync signal OHD, and supplies the sync signals to respective units so as to attain synchronism in the entire scanner.

In FIG. 3, the peripheral circuits of the sub-microcomputer 22 are omitted.

Figure 11:
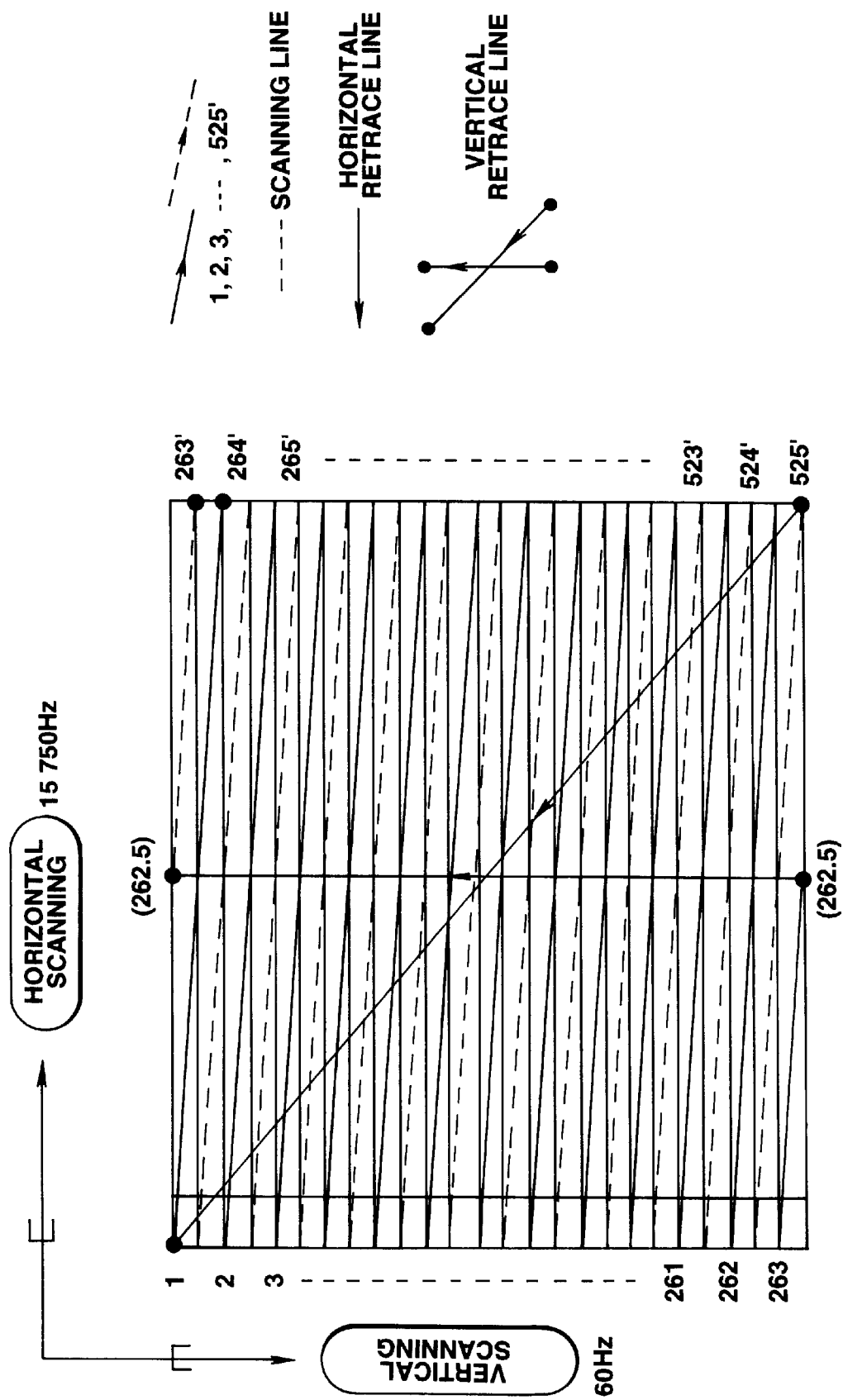
FIG. 11 is a diagram showing a typical interlacing pattern for producing a TV picture.

FIG. 11 is an explanatory diagram showing a typical interlacing for producing a TV picture. As stated in FIG. 11, a horizontal scanning frequency is 15.75 kHz and a vertical scanning frequency is 60 Hz. A TV screen of one frame is composed of a first field screen including scanning lines 1 to 263 indicated with solid lines in FIG. 11, and a second field screen including scanning lines 263' to 525' indicated with dashed lines. Although horizontal retrace lines and vertical retrace lines are depicted for better explanation, they are deleted from the screens in reality.

Figure 12:
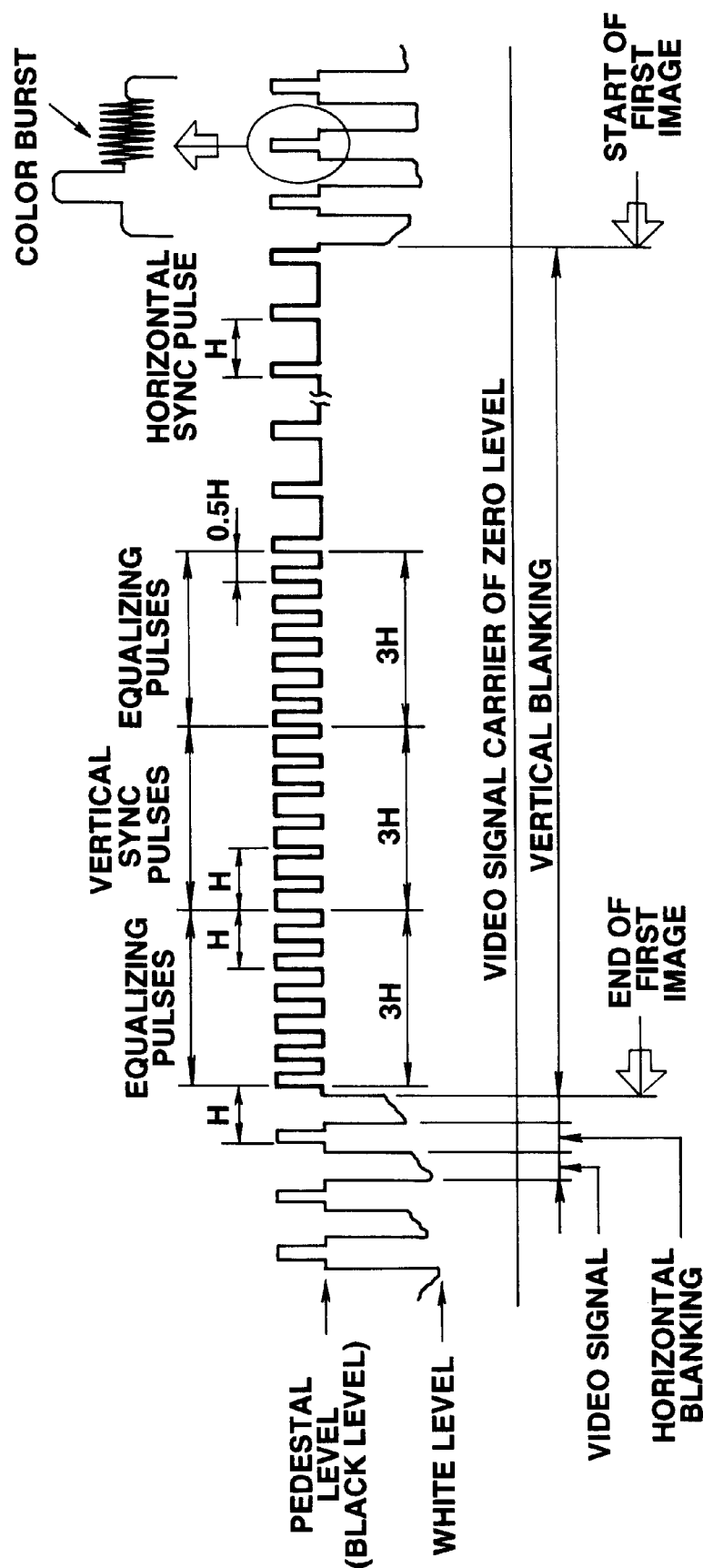
FIG. 12 is an explanatory diagram showing a vertical sync signal for the first field in the film scanner of the first embodiment.

FIG. 12 is an explanatory diagram concerning a waveform of a video signal coincident with blanking intervals of the first and second fields. It is apparent that the signal undergoes a phase shift of 0.5 H corresponding to a half of a duration of a horizontal sync pulse between the first field and next field.

The operations of the film scanner of this embodiment will be described in conjunction with the flowcharts of FIGS. 4 to 10. After a power supply that is not shown is turned on, when the scanner starts operating, first, the RISC microcomputer 21 and sub-microcomputer 22 are initialized (Power On Reset).

Figure 4:
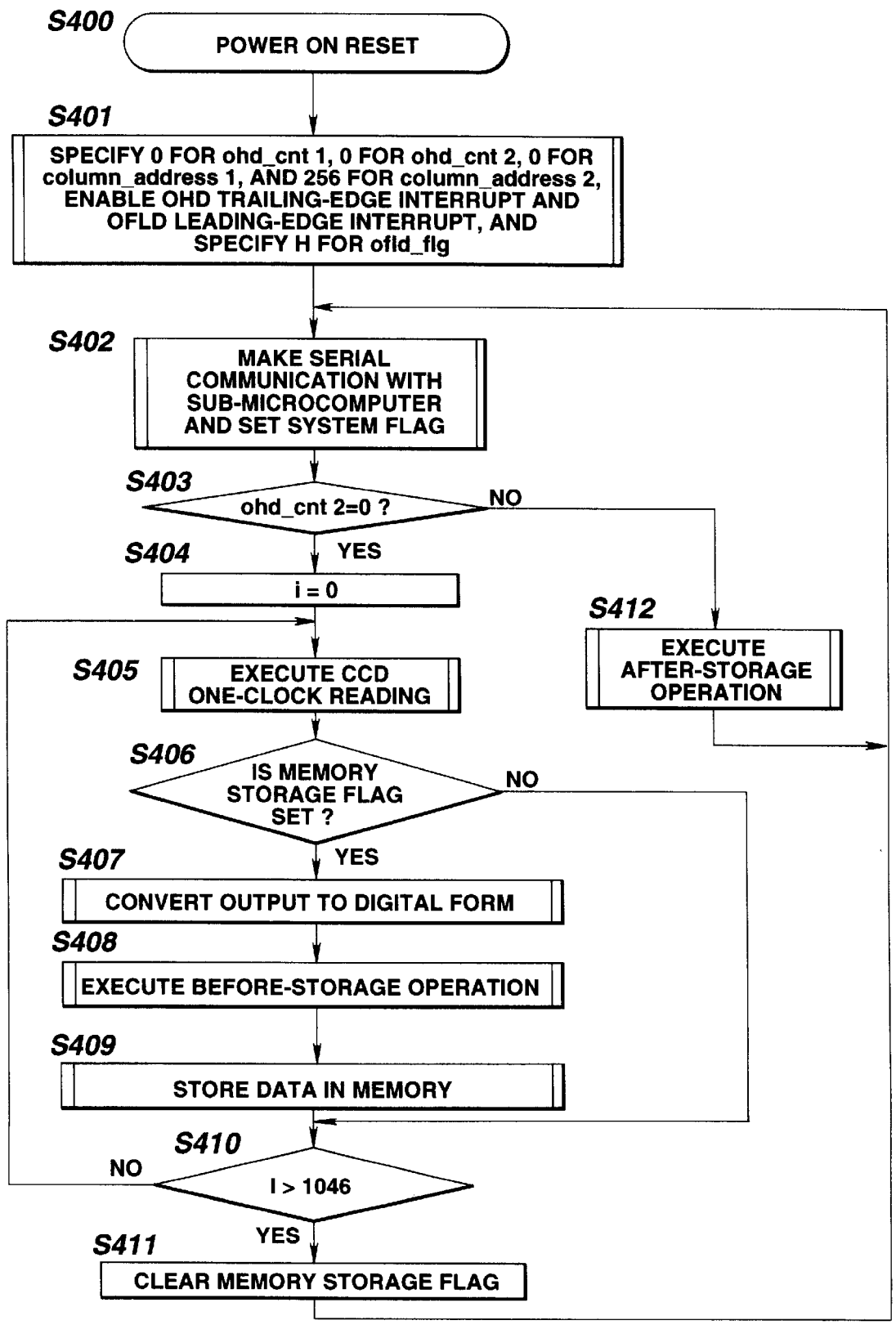
FIG. 4 is a flowchart describing the operations of the main control circuit succeeding Power On Reset Start in the film scanner of the first embodiment.

FIG. 4 shows a main routine of the RISC microcomputer 21. With Power On Reset, the RISC microcomputer 21 starts operating at step S400.

At step S401, the RISC microcomputer 21 resets a counter ohd_cnt1 for counting pulses of a horizontal sync signal OHD, and also resets a counter ohd_cnt2 for indicating a line sensor accumulating time, and thus performs initialization. In addition, the addresses of leading columns in the image memory at which the image data constituting the first field and that constituting the second field are stored are set to given values. Herein, 0 is specified for column_address1 meaning the leading column address at which the first-field image data is saved, and 256 is specified for column_address2 meaning the leading column address at which the second-field image data is saved. Moreover, a trailing-edge interrupt of the horizontal sync signal OHD that is an interrupt occurring at every trailing edge of the horizontal sync signal OHD is enabled, a leading-edge interrupt of the even/odd field signal OFLD that is an interrupt occurring at every leading edge of the even/odd field signal OFLD is enabled, and an even/odd flag ofld_flg is initialized to a high-level state (odd).

At step S402, the RISC microcomputer 21 makes a serial communication with the sub-microcomputer 22. The sub-microcomputer 22 transfers a system flag indicating an instruction entered using the operation switches 23 to a given area in the RISC microcomputer 21. The RISC microcomputer 21 performs subsequent processing according to the thus set system flag.

At step S403, the RISC microcomputer 21 checks if the value of the accumulating time counter ohd_cnt2 for the line sensor 13 is 0. If the value is 0, control is passed to step S404. If the value is not 0, control is passed to step S412. Steps S404 to S411 constitute a control flow for reading of an image signal from the line sensor 13. At step S412, data stored in a display area in the image memory is read in order to perform an operation such as shading correction, aperture correction, or color correction.

At step S404, the RISC microcomputer 21 resets a counter I indicating the number of clock pulses used to read the line sensor 13.

At step S405, the RISC microcomputer 21 sends one clock pulse used to read the line sensor 13.

At step S406, the RISC microcomputer 21 checks if a memory storage flag to be set at step S604 to be described later is set. If the flag is not set, control is passed to step S410. If the flag is set, control is passed to step S407.

At step S407, the RISC microcomputer 21 converts an output of the line sensor 13 provided at step S405 into a digital form.

At step S408, the RISC microcomputer 21 temporarily saves the data digitized at step S407 in a non-display area in the image memory 17, then performs an operation such as shading correction, aperture correction, or color correction while reading the previously-saved data from the image memory, and thus converts the data into image display data.

At step S409, the RISC microcomputer 21 stores the image display data in an associated image memory area.

At step S410, the RISC microcomputer 21 checks if the value of the counter I indicating the number of clock pulses used to read the line sensor 13 exceeds 1046. In this embodiment, as mentioned above, the number of effective pixels in the line sensor 13 is 1024. However, 1046 is selected so that a shift register within the line sensor 13 can be initialized reliably. If the value of the counter I exceeds 1046, it is regarded that reading the line sensor 13 is completed. After the memory storage flag is reset at step S411, control is returned to step S402. If the value of the counter I does not exceed 1046, control is returned to step S405. Reading the line sensor 13 is continued.

If a leading-edge interrupt or trailing-edge interrupt of the even/odd field signal OFLD occurs during the foregoing processing, the RISC microcomputer 21 passes control to an OFLD interrupt routine described in FIGS. 5 and 6. The RISC microcomputer 21 switches the occurrence of a leading-edge interrupt and that of a trailing-edge interrupt as a condition for enabling the next interrupt, sets the odd/even field flag, resets the horizontal sync signal counter chd_cnt1, and resets the accumulating time counter ohd_cnt2 for the line sensor 13.

If a leading-edge interrupt of the even/odd field signal OFLD occurs, the RISC microcomputer 21 passes control to step S500. At step S501, the condition for enabling the next interrupt is re-set to the occurrence of a trailing-edge interrupt, and the even/odd field flag ofld_flg is set to a high-level state (odd). Thereafter, at step S502, the horizontal sync signal counter ohd_cnt1 is reset, and the accumulating time counter ohd_cnt2 for the line sensor 13 is reset. At step S503, the interrupt processing is terminated. If a trailing-edge interrupt of the even/odd field signal OFLD occurs, the RISC microcomputer 21 passes control to step S504. At step S505, the conditions for enabling the next interrupt is set to the occurrence of a leading-edge interrupt, and the even/odd field flag ofld_flg is set to a low-level state (even). Thereafter, the interrupt processing is terminated at step S506.

Figure 7:
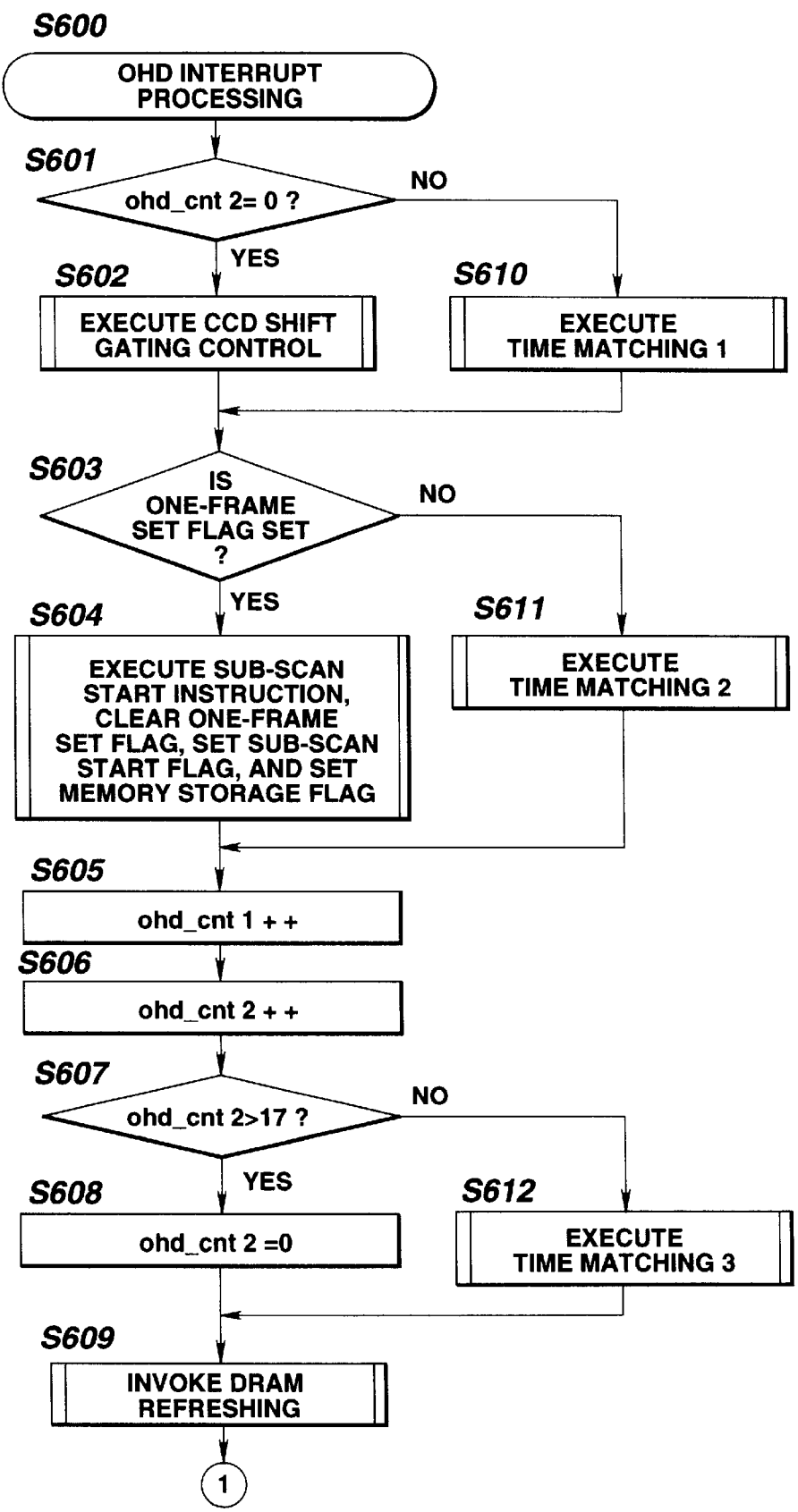
FIG. 7 is a flowchart describing a subroutine for processing an interrupt of a horizontal sync signal OHD in the film scanner of the first embodiment.
Figure 8:
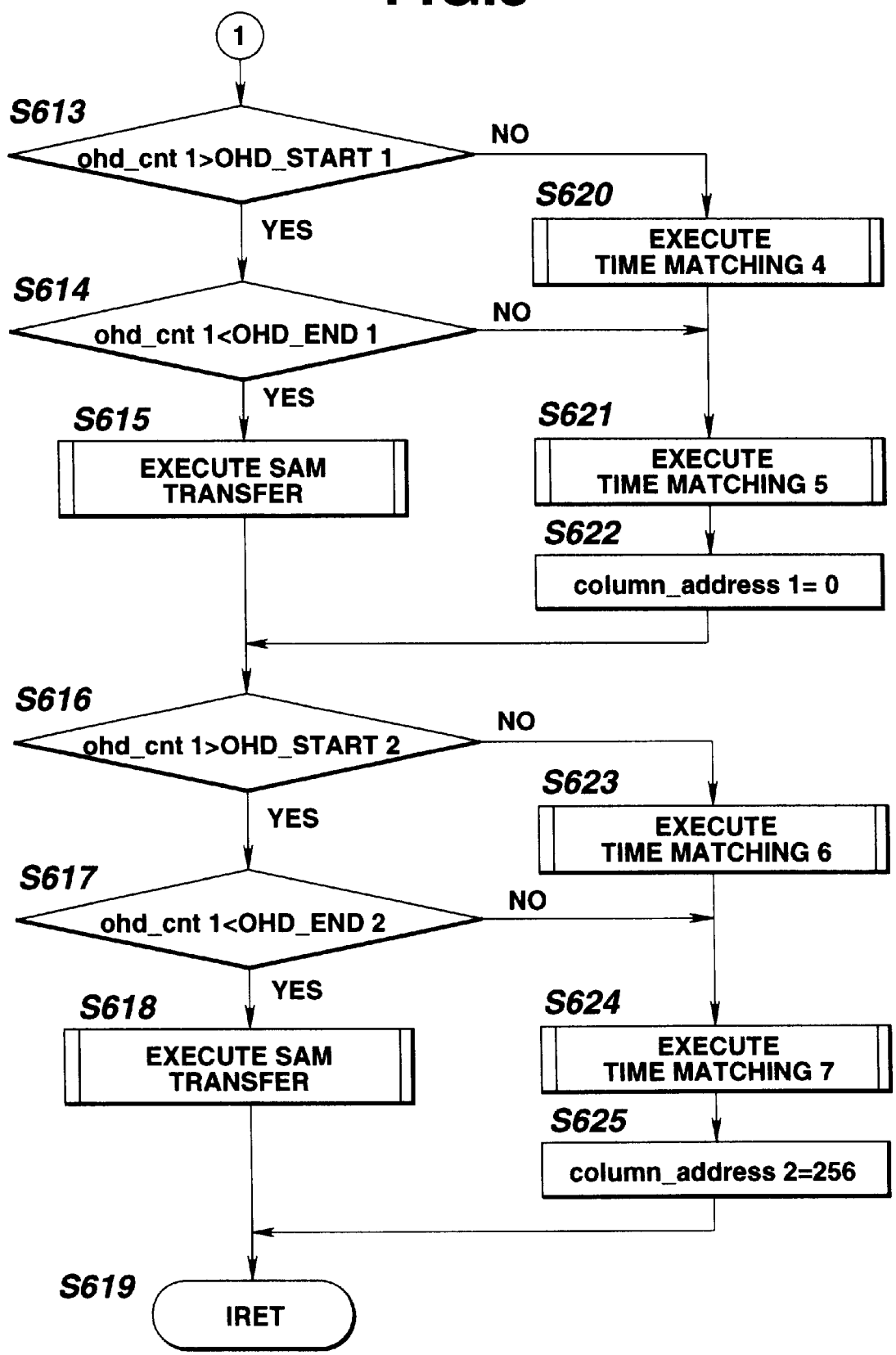
FIG. 8 is a flowchart describing a subroutine for processing an interrupt of a horizontal sync signal OHD in the film scanner of the first embodiment, FIGS. 7 and 8, taken together in the manner shown comprise this subroutine.

Aside from an interrupt by an even/odd field signal, if an interrupt of the horizontal sync signal OHD occurs, the RISC microcomputer 21 passes control to an OHD interrupt routine described in FIGS. 7 and 8. Storing time control for the line sensor 13, refreshing of the DRAM incorporated in the image memory 17, and SAM transfer for outputting image data from the image memory 17 are then assigned priorities and executed time-sequentially according to given timing.

At step S601, the RISC microcomputer 21 checks if the value of the sensor accumulating time counter ohd_cnt2 is 0. If the value is 0, shift gating control is executed for the line sensor 13 at step S602. After charge accumulated on a photodiode in the line sensor 13 is transferred to an analog shift register, control is passed to step S603. If the ohd_cnt2 value is not 0, time matching 1 is executed to permit the passage of time equivalent to processing time required for step S602. Control is then passed to step S603.

A one-frame set flag is a flag to be set at step S402 in FIG. 4 when film is wound up by one frame. A step S603, the RISC microcomputer 21 checks if the one-frame set flag is set. If the flag is set, the port P1 is driven low at step S604 in order to send an interrupt for starting a sub-scan. The one-frame set flag is reset, the sub-scan flag is set, and then the memory storage flag is set. Thereafter, control is passed to step S605. If it is found at step S603 that the one-frame set flag is not set, time matching 2 is executed to permit the passage of time equivalent to processing time required for step S604 at step S611. Control is then passed to step S605.

At step S605, the RISC microcomputer 21 increments the horizontal sync signal counter ohd_cnt1. At step S606, the RISC microcomputer 21 increments the sensor accumulating time counter ohd_cnt2.

When the RISC microcomputer 21 finds at step S607 that the value of the sensor accumulating time counter ohd_cnt2 exceeds 17, the RISC microcomputer 21 resets the counter ohd_cnt2 at step S608, and then passes control to step S609. If the ohd_cnt2 value does not exceed 17, time matching 3 is executed to permit the passage of time equivalent to processing time required for step S608 at step S612. Control is then passed to step S609. Herein, the reason why the given value is 17 lies in that assuming that the line sensor accumulating time is approximately 1 msec., since the time required for one horizontal scan is approximately 63.5 $\mu$sec., the accumulating time corresponds to approximately 16 lines.

At step S609, the RISC microcomputer 21 refreshes the DRAM in the image memory 17 according to a procedure described in FIG. 8.

When the RISC microcomputer 21 finds at steps S613 and S614 that the value of the horizontal sync signal counter ohd_cnt1 is larger than a given value OHD_START1 and smaller than a given value OHD_END1, the RISC microcomputer 21 judges that the value of the horizontal sync signal counter ohd_cnt1 indicates a first field image, passes control to step S615, and executes SAM transfer so as to output image data through a serial port on a serial basis. When finding at step S613 that the value of the horizontal sync counter ohd_cnt1 is smaller than the given value OHD_START1, the RISC microcomputer 21 executes time matching 4 to permit the passage of time equivalent to processing time required for S614 at step S620, and then passes control to step S621.

When finding at step S614 that the value of the horizontal sync signal counter ohd_cnt1 is not smaller than the given value OHD_END1, the RISC microcomputer 21 executes time matching 5 to permit the passage of time equivalent to processing time required for step S615 at step S621, and then passes control to step S622. After 0 is specified for the column address for first field image data, column_address1, control is passed to step S616.

When finding at steps S616 and S617 that the value of the horizontal sync signal counter ohd_cnt1 is larger than a given value OHD_START2 and smaller than a given value OHD_END2, the RISC microcomputer 21 judges that the value of the horizontal sync signal counter ohd_cnt1 indicates a second field image, passes control to step S618, and executes SAM transfer so as to output image data through the serial port on a serial basis.

When finding at step S616 that the value of the horizontal sync signal counter ohd_cnt1 is smaller than the given value OHD_START2, the RISC microcomputer 21 executes time matching 6 to permit the passage of time equivalent to processing time required for step S617 at step S623, and then passes control to step S624. When finding at step S617 that the value of the horizontal sync signal counter ohd_cnt1 is not smaller than the given value OHD_END2, the RISC microcomputer 21 executes time matching 7 to permit the passage of time equivalent to processing time required for step S618 at step S624, passes control to step S625, and sets 256 for the column address for the second field image data column_address2. Thereafter, control is passed to step S619 in order to terminate OHD interruption.

Figure 9:
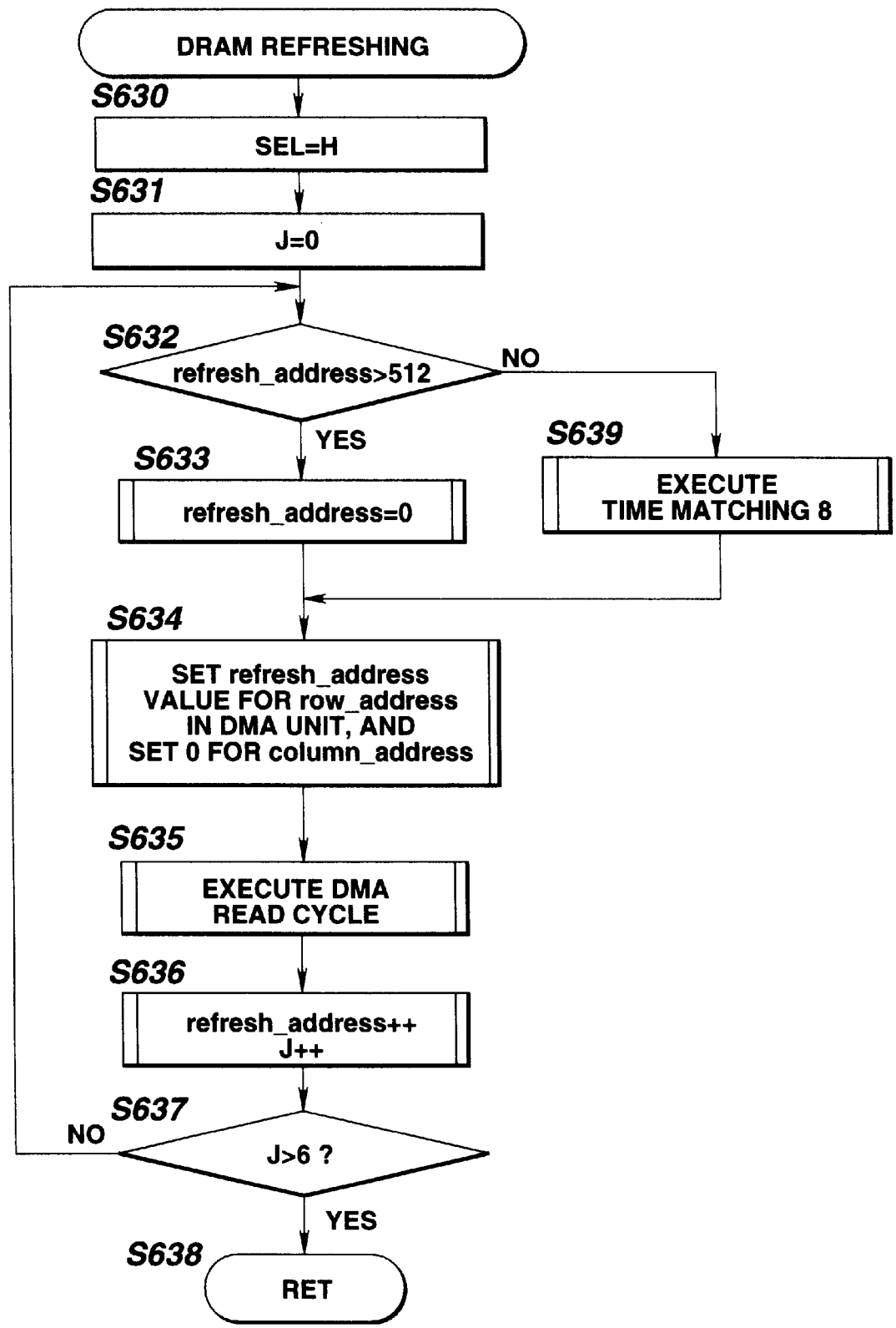
FIG. 9 is a flowchart describing a subroutine for refreshing a DRAM in the film scanner of the first embodiment.

FIG. 9 is a flowchart describing a subroutine for refreshing the DRAM incorporated in the image memory 17. At step S630, the RISC microcomputer 21 drives the port SEL high. At step 631, a refresh counter J is reset.

At step S632, the RISC microcomputer 21 checks if a refresh_address value is larger than 512. If the value is larger, the refresh address refresh_address is reset at step S633, and then control is passed to step S634. If the refresh_address value does not exceed 512, control is passed to step S639. After time matching 8 is executed to permit the passage of time equivalent to processing time required for step S633, control is passed to step S634.

At step S634, the RISC microcomputer 21 sets the contents of refresh_address for row_address, which indicates a row address in the DRAM to be refreshed, in the DMA unit. After resetting column_address indicating a column address in the DRAM, the RISC microcomputer 21 executes a cycle of reading the DMA unit. Thus, all the data existent at the row address specified by the contents of refresh_address is refreshed.

At step S636, the contents of refresh_address are incremented in order to increment the row address in the DRAM to be refreshed. In addition, the refresh counter J is incremented.

At step S637, the RISC microcomputer 21 checks if the value of the refresh counter J is larger than 6. If the value is larger, DRAM refreshing is terminated at step S638. If the value of the refresh counter J does not exceed 6, control is returned to step S632. Owing to this procedure, every time an interrupt by the horizontal sync signal OHD occurs, the data in the DRAM is refreshed in units of seven rows according to the same timing. The reason why the DRAM is refreshed in units of seven rows is such that: approximately 33 msec. is required for displaying one frame image; the specification of a holding time per refreshing in the DRAM is approximately 8 msec.; and therefore line image data for at least six rows must be refreshed at a time so that line image data for all of 512 rows can be held until display of one screen is completed.

Figure 10:
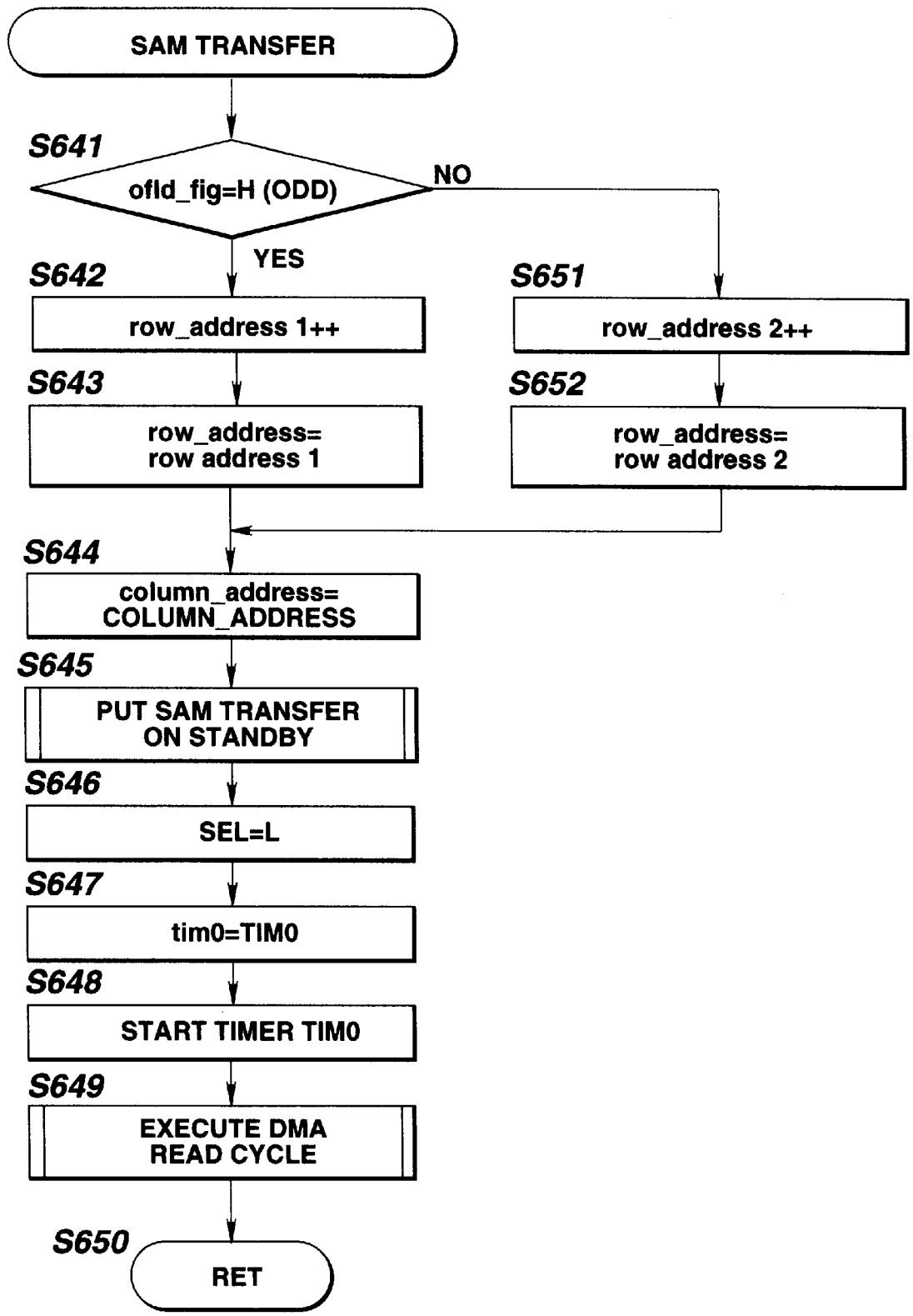
FIG. 10 is a flowchart describing a subroutine of SAM transfer in the film scanner of the first embodiment.

FIG. 10 is a flowchart describing a subroutine for transferring image data from the DRAM incorporated in the image memory 17 into the SAM and outputting the data on a serial basis.

At step S641, the RISC microcomputer 21 checks the even/odd field flag ofld_flg. If the flag is set to a high-level state (odd), the row address row_address1 is incremented at step S642. After the contents of row_address1 are set for a row address in the DMA unit at step S643, control is passed to step S644. If the even/odd field flag ofld_flg is set to a low-level state (even), the row address row_address2 is incremented at step S651. After the contents of row_address2 are set for a row address in the DMA unit at step S652, control is passed to step S644.

At step S644, the RISC microcomputer 21 sets a given value COLUMN_ADDRESS for a column address in the DMA unit.

At step S645, the RISC microcomputer 21 puts SAM transfer on standby for a period of a wait time to be expired when a scanning line of a TV screen reaches a horizontal position for picture output. At step S646, the RISC microcomputer 21 drives the port SEL low so as to bring the image memory into SAM transfer mode. At step S647, a given value TIM0 is set for a time counter tim0 incorporated in the RISC microcomputer 21. Thereafter, at step S648, the counter tim0 is started. At step S649, a cycle of reading the DMA unit at a high speed is executed. The timing of outputting image data is determined with the time indicated by the counter tim0 and the wait time arising at step S645.

As mentioned above, the RISC microcomputer 21 transfers image data from the DRAM in the image memory to the SAM. Synchronously with the timing that a scanning line of a TV monitor screen reaches a horizontal position for picture output, serial output of stored picture data is started in order to change the DT/OE port of the image memory 17 shown in FIG. 3 from low to high. Consequently, R, G, and B image data, each of which is 6 bits long, are output from the image memory 17. When image data output is completed, SAM transfer is terminated at step S650.

Next, the second embodiment of the present invention will be described.

A film scanner of the second embodiment has substantially the same configuration as that of the first embodiment. A slight difference lies in OHD interrupt processing (See FIG. 7). Herein, only the difference will be described.

Figure 14:
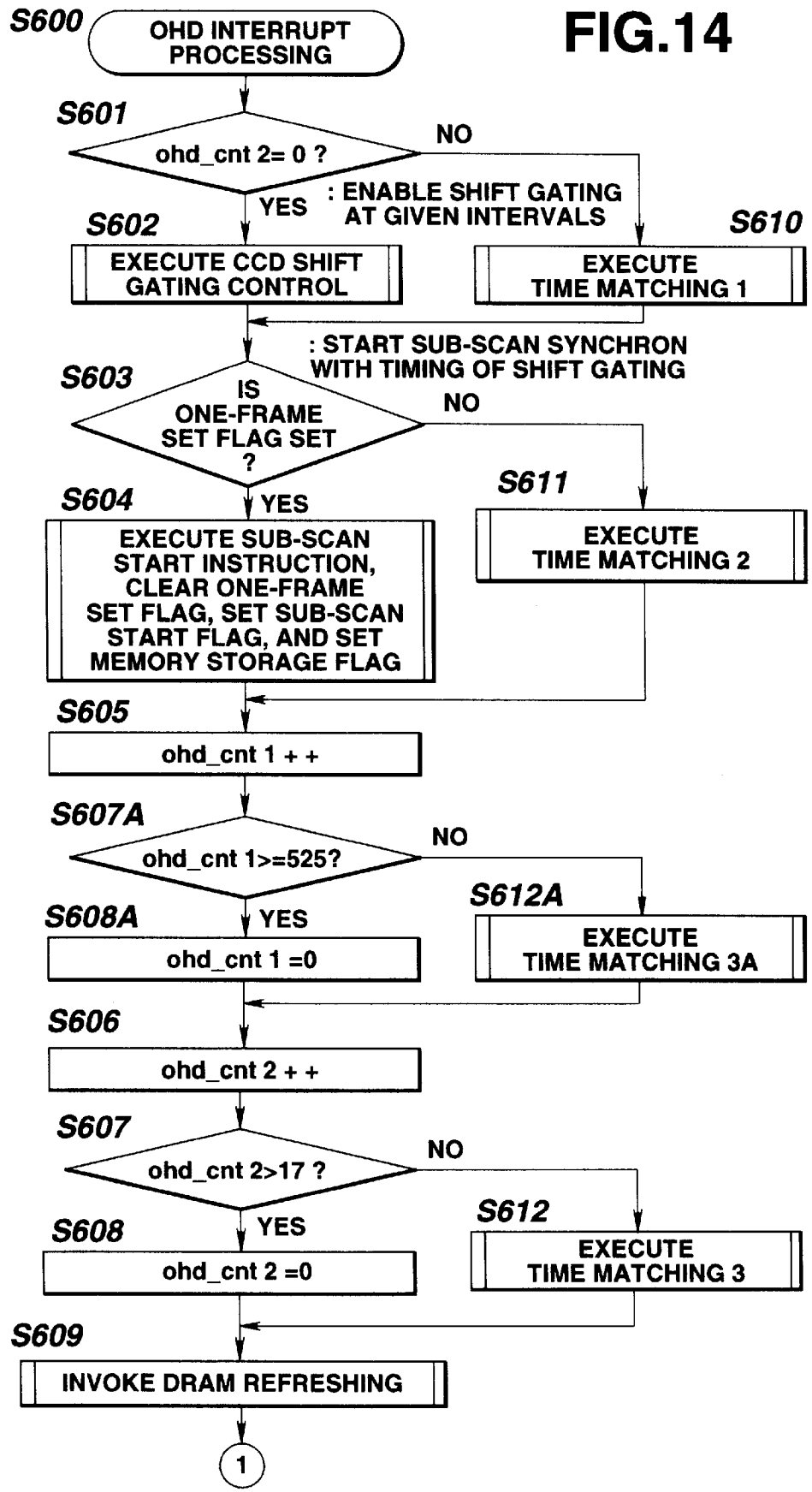
FIG. 14 is a flowchart describing a subroutine for processing an interrupt by a horizontal sync signal OHD in a film scanner of the second embodiment of the present invention.

FIG. 14 is a flowchart describing OHD interrupt processing employed in the film scanner of the second embodiment.

As apparent from comparison of the flowchart with the one of FIG. 7, in the second embodiment, new processing is executed between steps S605 and 606.

At step S605, the RISC microcomputer 21 increments the counter ohd_cnt1. When it is found at step S607A that the value of the counter ohd_cnt1 exceeds 525, if the counter is not reset to 0 at step S608A, time matching 3A is executed at step S612A.

The other operations are the same as those of the first embodiment. The detailed description of the operations will be omitted.

In the first and second embodiment, as mentioned above, a horizontal sync signal is used for synchronization. Alternatively, a horizontal blanking signal indicated with BK in FIG. 14 may be used for synchronization. In the first and second embodiment, it is judged on the basis of an output OFLD of a timing generator whether a current field is an even-numbered or odd-numbered field. Alternatively, whether a horizontal sync signal is high or low may be checked synchronously with a vertical sync signal for the judgment.

Next, the third embodiment of the present invention will be described.

Figure 15:
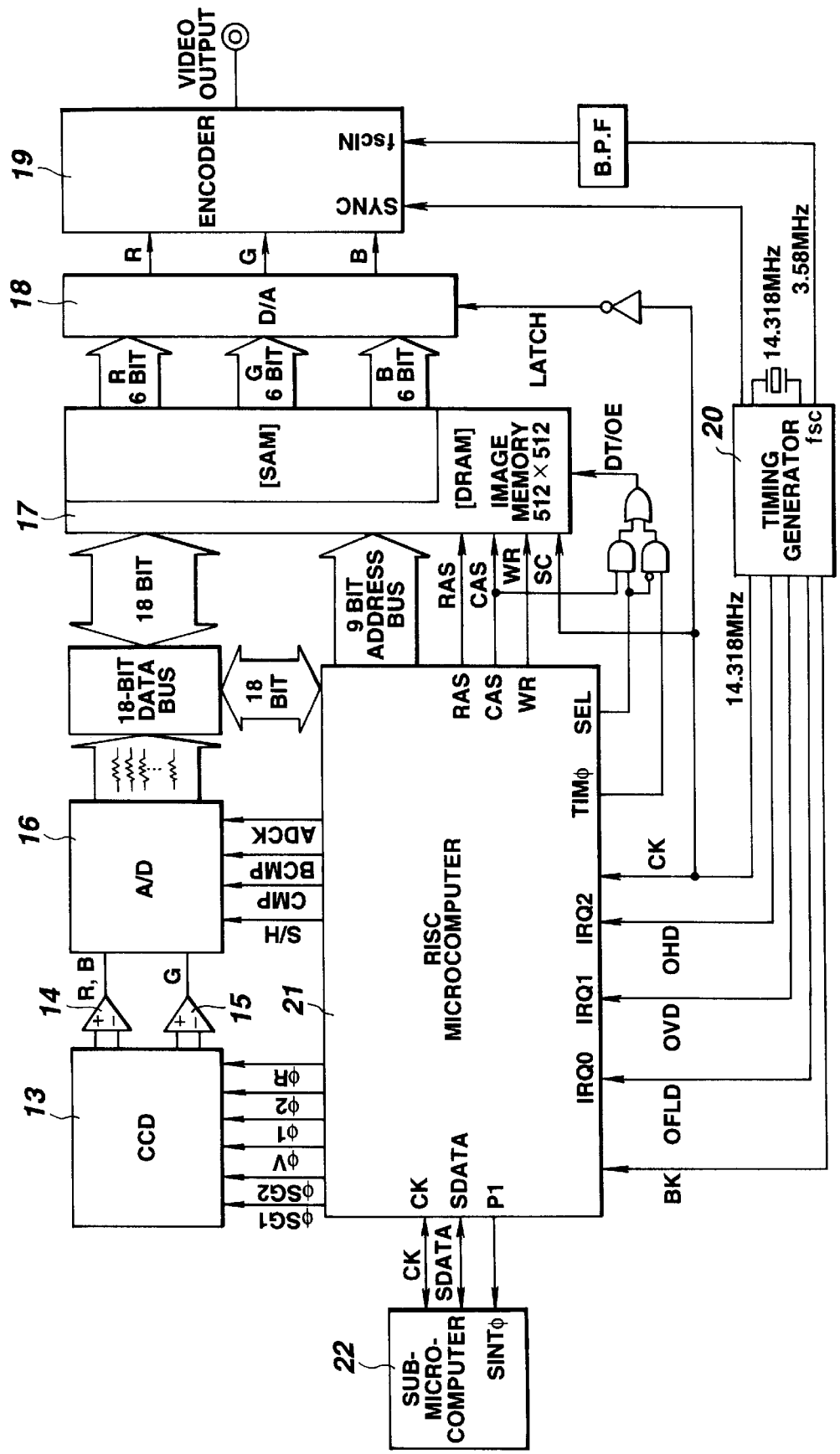
FIG. 15 is an electrical circuit diagram showing a variant of a main control circuit and its peripheral circuits in the film scanner of the first or second embodiment.

FIG. 15 is a block diagram showing the configuration of a main section of a film scanner of the third embodiment.

The film scanner of the third embodiment has substantially the same basic configuration as that of the first embodiment. However, the film scanner does not have the TV sync signal generating means 7 included in the film scanner of the first embodiment. The third embodiment is characterized in that the controller 6 fills the role of the TV sync signal generating means 7 in the form of software.

To be more specific, the third embodiment has the configuration that the controller 6 produces a TV sync signal (a composite sync signal, horizontal sync signal, vertical sync signal, horizontal blanking signal, vertical blanking signal, or the like) and a subcarrier, which are to be sent to the encoder means 5, on a software basis.

The other component elements are identical to those of the first embodiment. The detailed description of the components will be omitted.

According to the third embodiment, a system can be constructed with hardware minimized.

Figure 16:
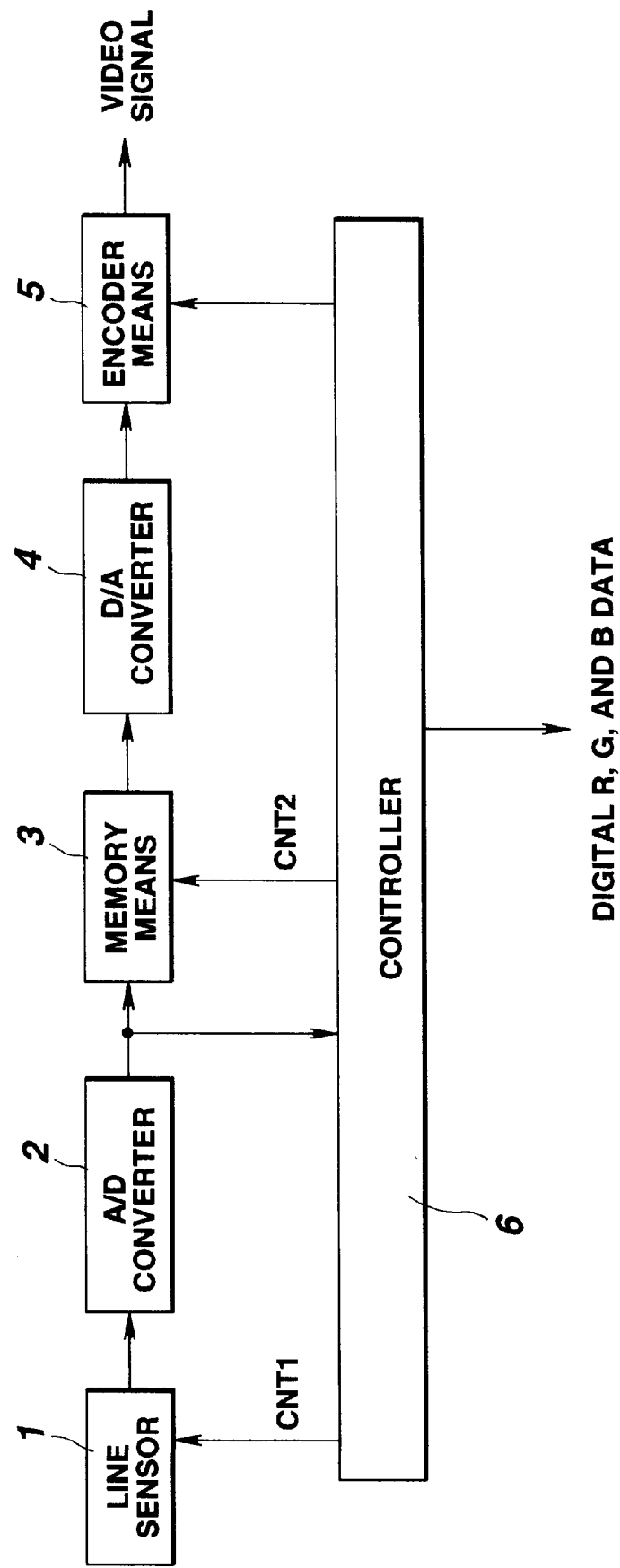
FIG. 16 is a block diagram showing the configuration of a major section of a film scanner of a third embodiment of the present invention.

FIG. 16 is an electrical circuit diagram showing in detail the configuration of an RISC microcomputer and its peripheral circuits in the film scanner of the third embodiment.

Figure 17:
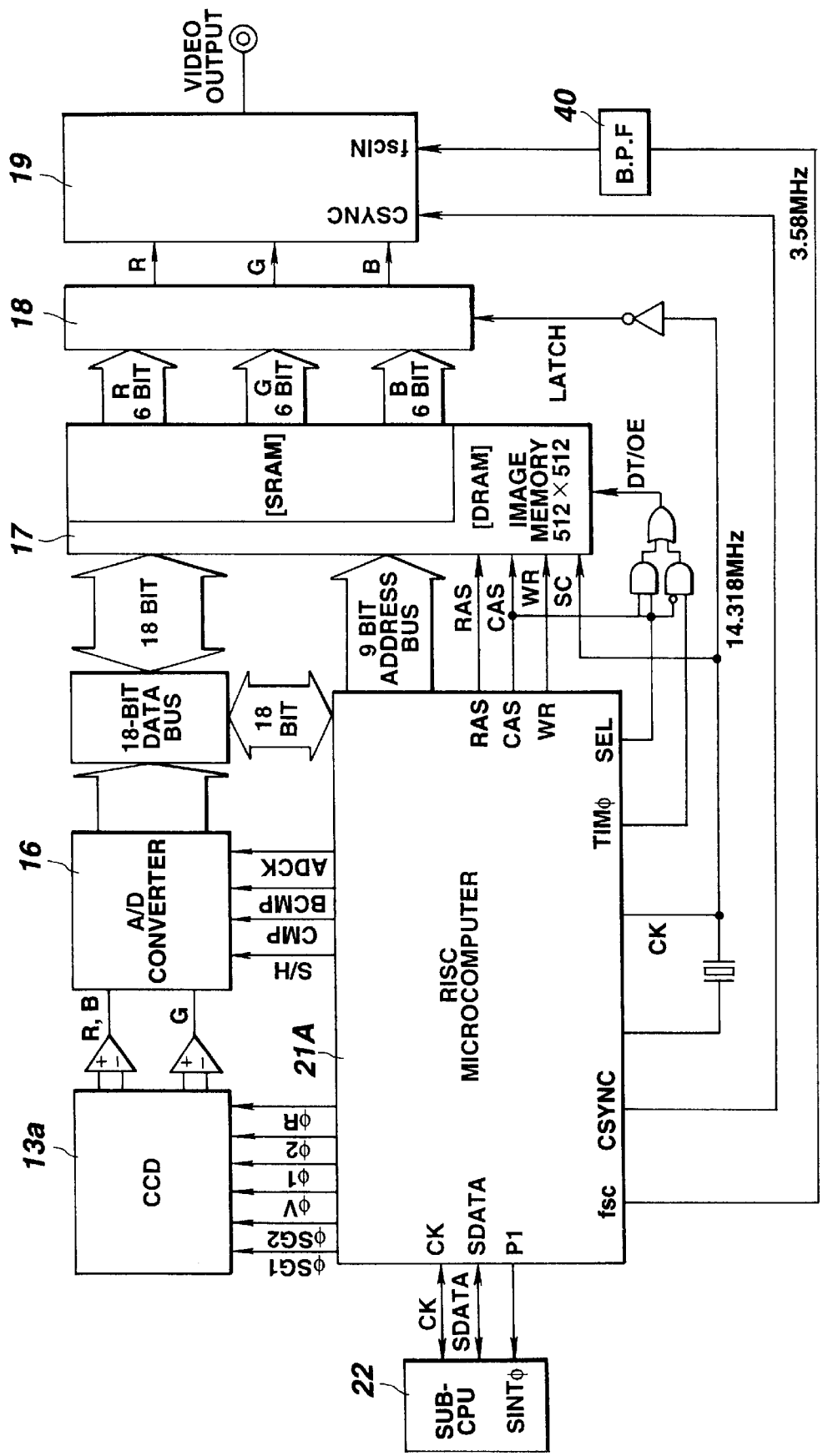
FIG. 17 is an electrical circuit diagram showing in detail the circuitry of a major control circuit and its peripheral circuits in the film scanner of the third embodiment.

The film scanner of the third embodiment (FIG. 17) is characterized in that an RISC microcomputer 21A supplies a clock used for serial transfer to or from the SAM in the image memory 17, a clock used to latch the D/A converter 18, and a subcarrier and composite sync signal to be sent to the encoder on a software basis. The other component elements are identical to those of the first embodiment. A detailed description of the elements will therefore be omitted.

Owing to the foregoing configuration, the timing generator 20 (See FIG. 3) included in the film scanner of the first embodiment becomes unnecessary. Hardware becomes therefore concise and simpler. Moreover, since a single controller carries out TV display and CCD control, timing can be described orderly in a program. This brings about such merits that the software configuration can be simplified, that it can be prevented that software looks like spaghetti (gets complicated), and that an unexpected bug can be avoided.

The operations of the film scanner of the third embodiment will be described concisely with reference to the flowcharts of FIGS. 18 to 21 as well as FIGS. 22 and 11 to 13.

First, the power switch (not shown) of the film scanner of the third embodiment is turned on. After power is supplied to the film scanner, the RISC microcomputer 21A and sub-CPU 22 undergo Power On Reset.

Figure 18:
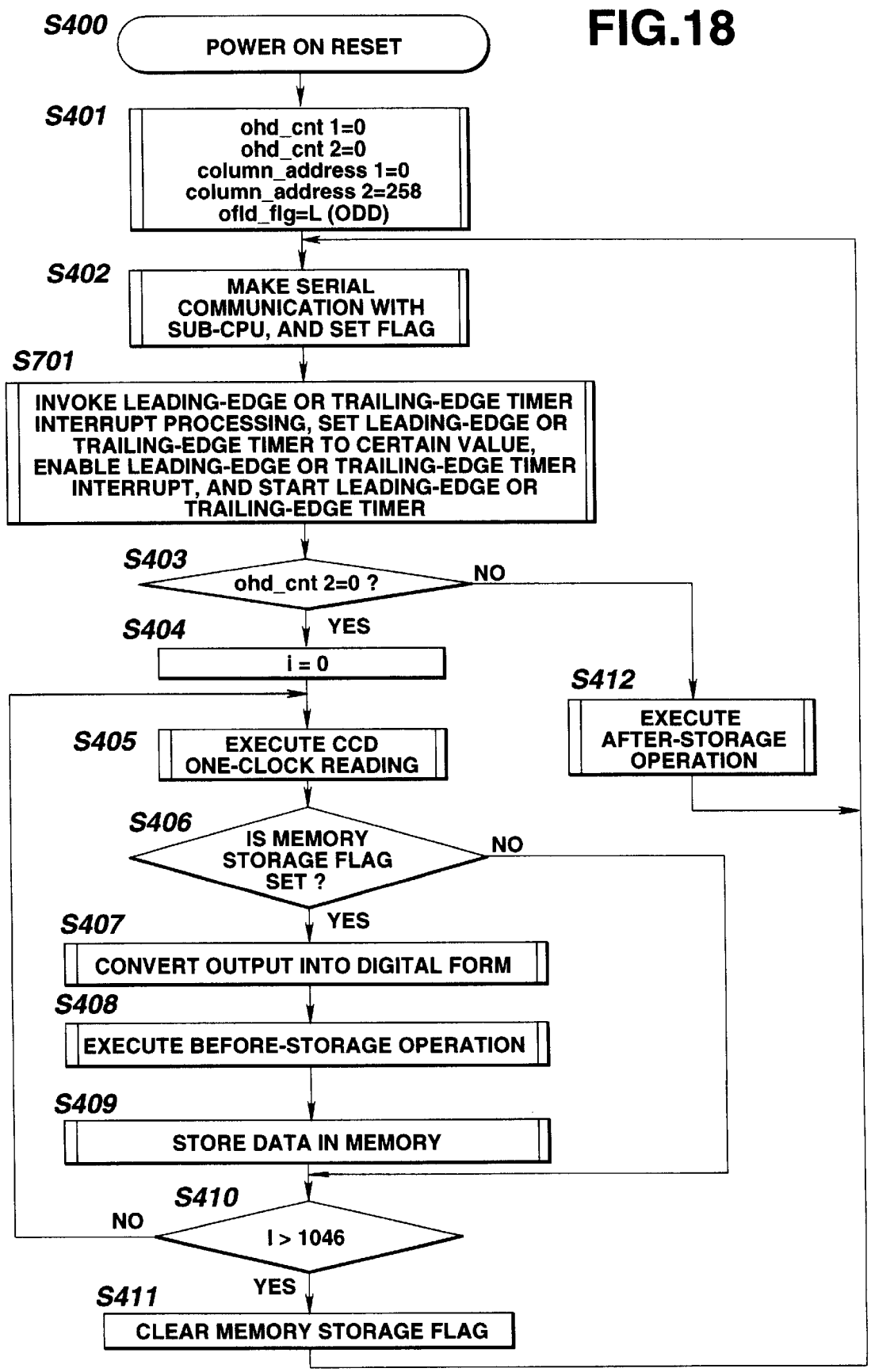
FIG. 18 is a flowchart describing the operations of the main control circuit succeeding Power On Reset Start in the film scanner of the third embodiment.

FIG. 18 describes a main routine of the RISC microcomputer 21A succeeding Power On Reset in the third embodiment, and corresponds to the flowchart of FIG. 4. In the drawing, the processing from step S400 to step S412 is identical to that shown in FIG. 4. The description of the processing will therefore be omitted.

A difference from the first embodiment is such that: as shown in FIG. 4, in the first embodiment, an external interrupt by the horizontal sync signal OHD is used for timing control; but in the third embodiment, as described as step S701 in FIG. 18, a software interrupt by a timer ticking at every leading edge or trailing edge of a horizontal sync signal is used.

Owing to this configuration, the timing generator 20 included in the film scanner of the first embodiment can be eliminated.

A composite sync signal and subcarrier sent from the timing generator 20 to the encoder are, in the third embodiment, generated by the RISC microcomputer 21A. Specifically, the composite sync signal is produced on the basis of a pattern by an internal time counter of the RISC microcomputer 21A, and output through the CSYNC port. The subcarrier is provided with a quarter of an input frequency (14.318 MHz) of the RISC microcomputer 21A by means of a frequency divider incorporated in the RISC microcomputer and output through the fsc port.

Figure 19:
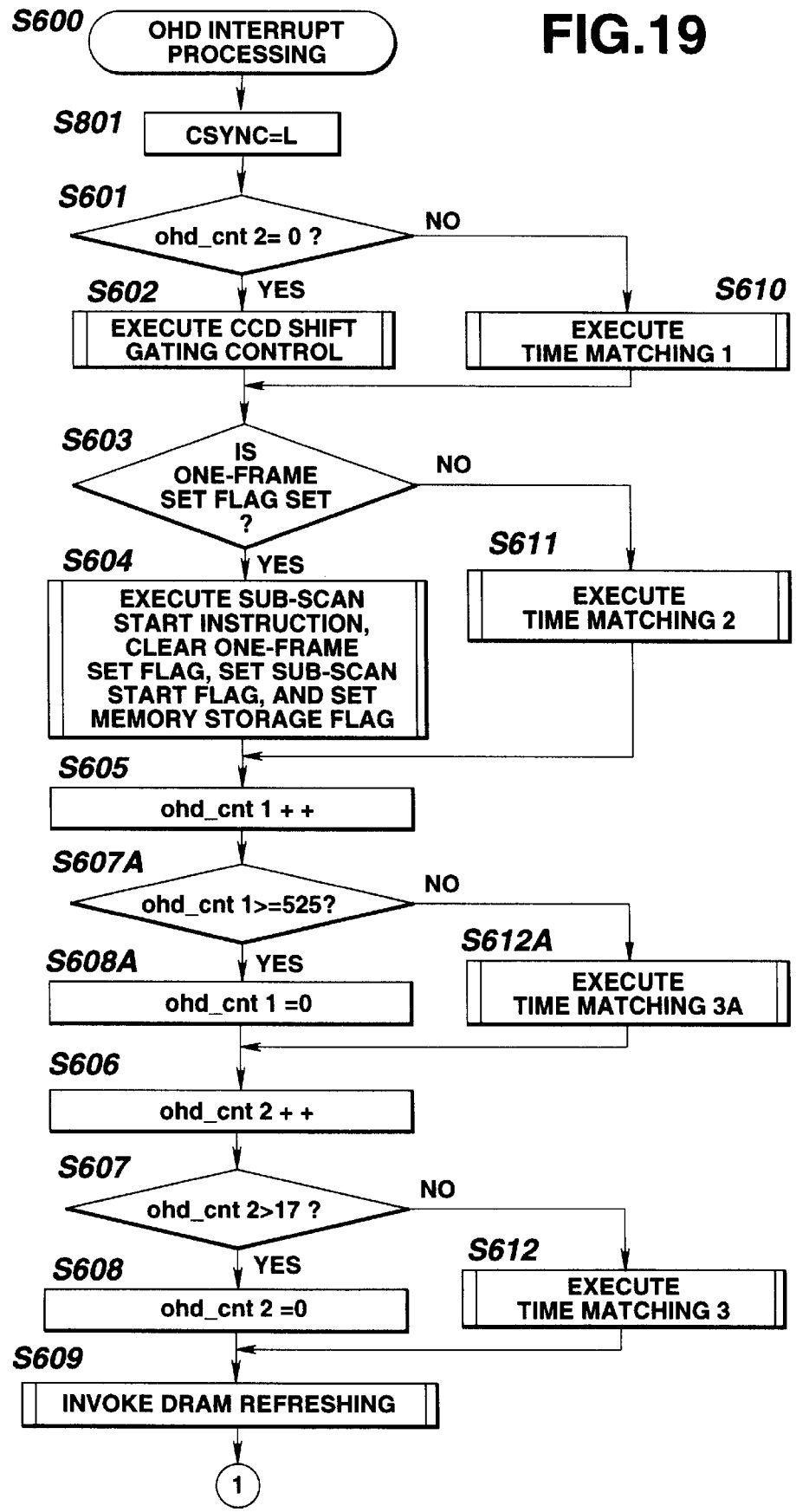
FIG. 19 is a flowchart describing a subroutine for processing a high-level timer interrupt in the film scanner of the third embodiment.
Figure 20:
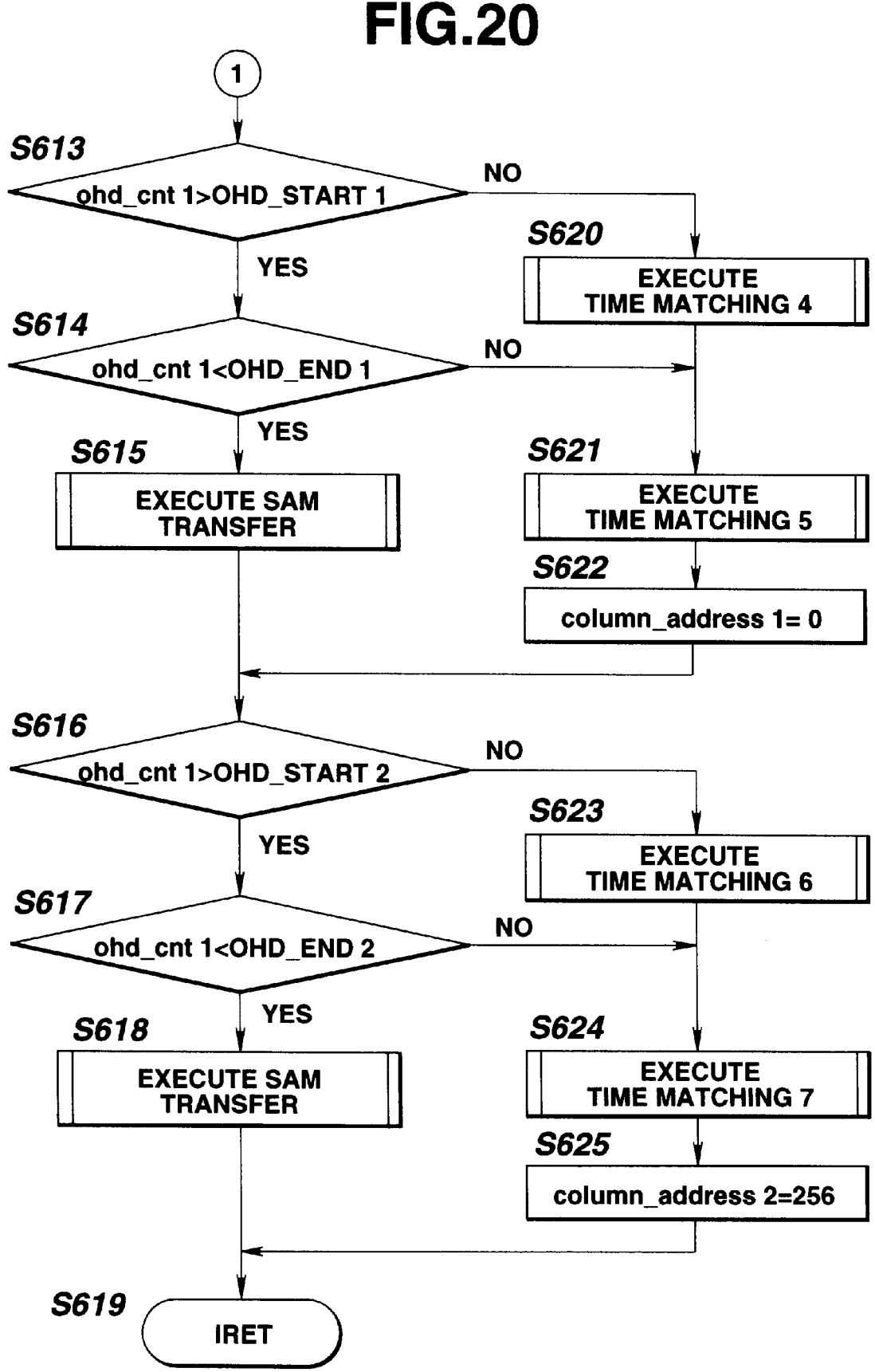
FIG. 20 is a flowchart describing a subroutine for processing a high-level timer interrupt in the film scanner of the third embodiment, FIGS. 19 and 20, taken together, describe this subroutine.

FIGS. 19 and 20 are flowcharts describing a subroutine of leading-edge timer interrupt processing in the third embodiment.

In the third embodiment, when a software interrupt (leading-edge timer interrupt) occurs, this routine is called. After the CSYNC port is driven low (step S801), CCD exposure control, TV display control, and DRAM refreshing are executed. The processing from step S601 to step S619 in the drawings is identical to that in the first embodiment (See FIGS. 7 and 8). The description of the processing will therefore be omitted.

Figure 21:
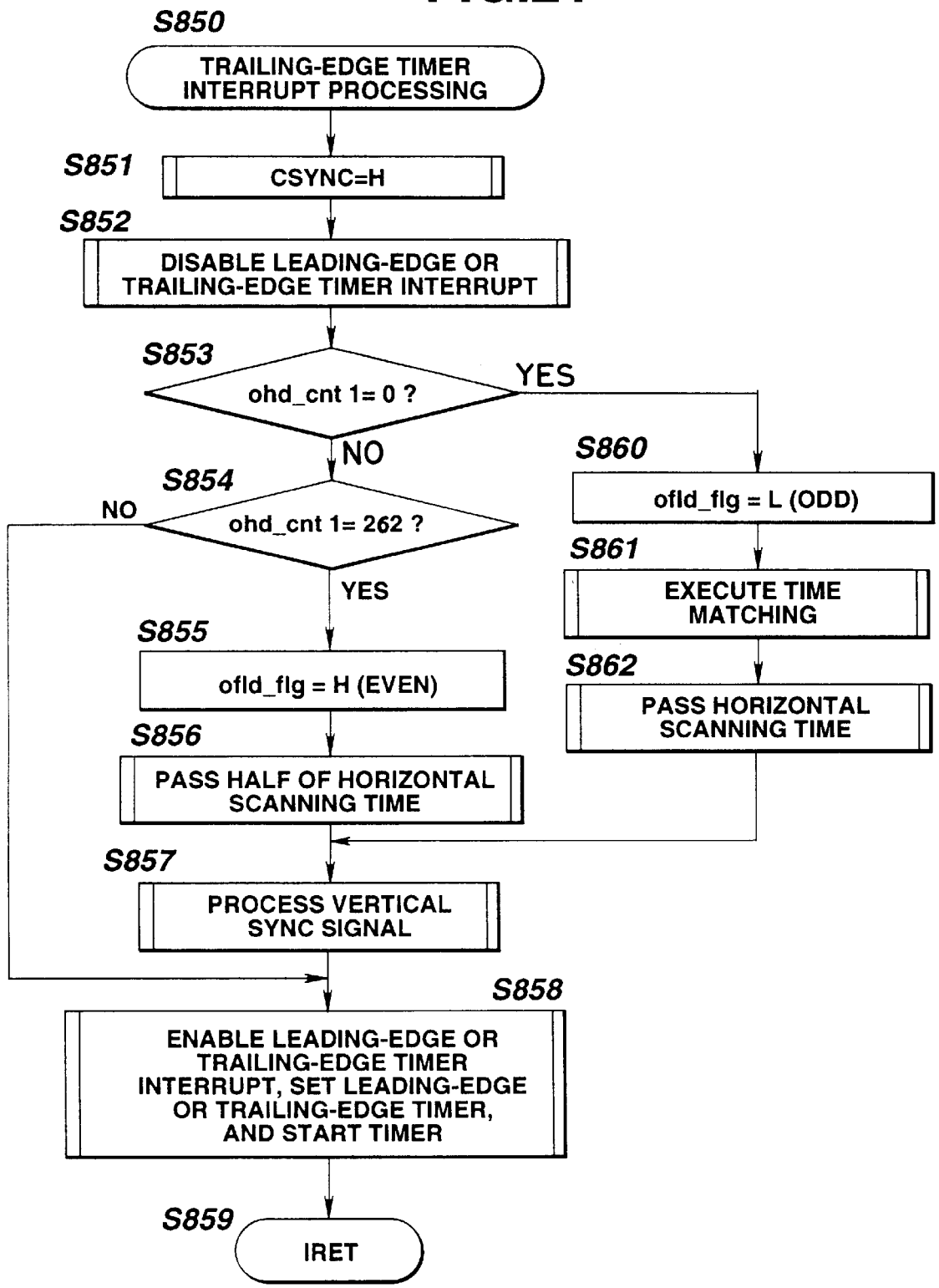
FIG. 21 is a flowchart describing a subroutine for processing a low-level timer interrupt in the film scanner of the third embodiment.

FIG. 21 is a flowchart describing a subroutine of trailing-edge timer interrupt processing in the third embodiment.

In the third embodiment, when a software timer interrupt (trailing-edge timer interrupt) occurs, this routine is called. After the CSYNC port is driven high, the even/odd flag ofld_flg indicating whether a current field is an even-numbered field or odd-numbered field is set, and then a vertical sync signal is processed. The routine will be described with reference to the flowcharts.

When a software timer interrupt (trailing-edge timer interrupt) occurs, this routine is called (step S850). At step S851, the RISC microcomputer 21A drives the CSYNC port high.

At step S852, the RISC microcomputer 21A disables a leading-edge or trailing-edge timer interrupt. Thereafter, the RISC microcomputer 21A checks at step S853 if the value of a TV display counter ohd_cnt1 is 0. If the value is 0, control is passed to step S860. The even/odd flag ofld_flg is set to a low-level state (odd). At step S861, the time required for the processing route from step S853 to step S856 is matched with the time required for the processing route from step S853 to step S862. At step S862, a wait time corresponding to a horizontal scanning time for one line is passed. Thereafter, a vertical sync signal is processed at step S857.

At step S854, the RISC microcomputer 21A checks if the value of the TV display counter ohd_cnt1 is 262. If the value is 262, control is passed to step S855. The even/odd flag ofld_flg is set to a high-level state (even). At step S856, a wait time corresponding to a half of a horizontal scanning time for one line is passed. Thereafter, a vertical sync signal is processed at step S857.

Herein, if the value of the TV display counter ohd_cnt1 is neither 0 nor 262, control is passed to step S858. The leading-edge or trailing-edge timer interrupt is enabled, and the leading-edge or trailing-edge timer is set and started.

Figure 22:
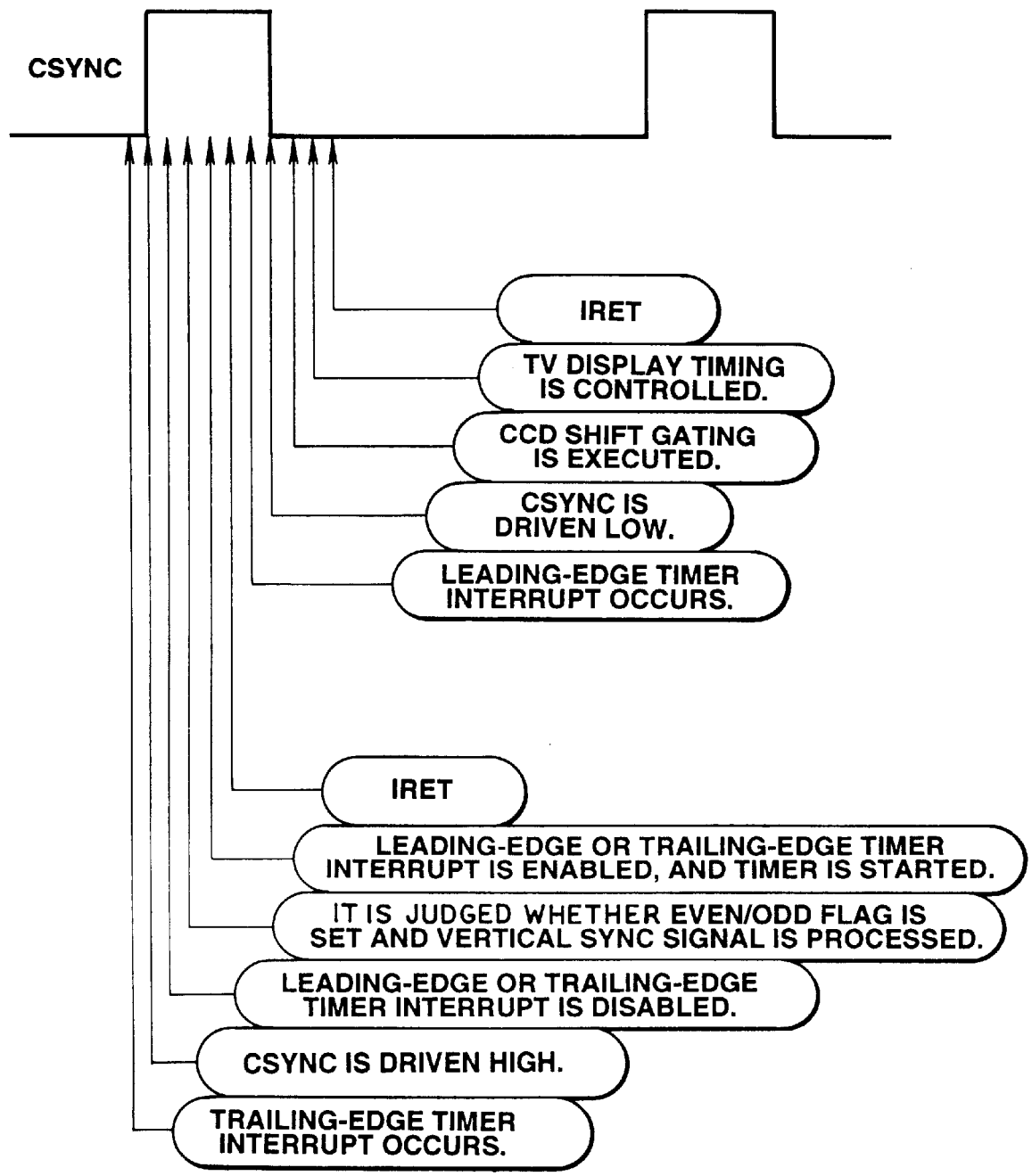
FIG. 22 is a diagram for explaining production of a horizontal TV sync signal of a composite signal (CSYNC) in the the film scanner of the third embodiment.
Figure 23:
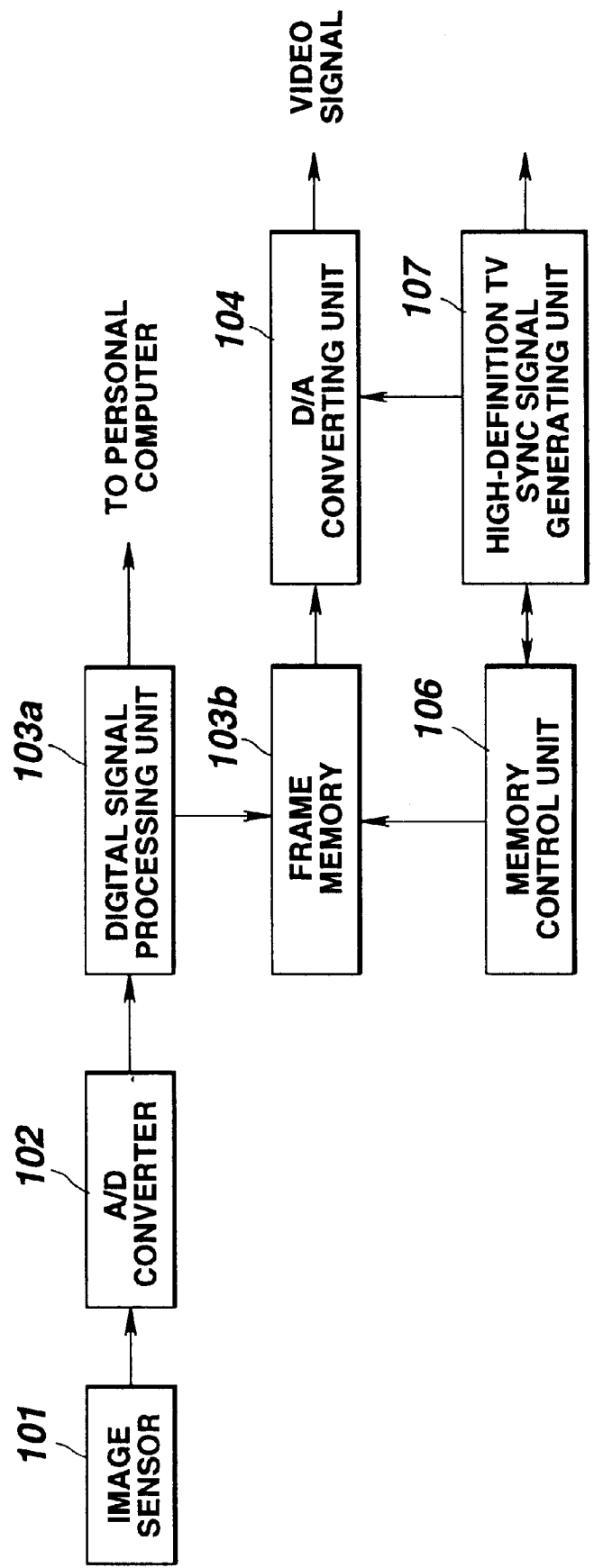
FIG. 23 is a block diagram showing an example of a known film scanner.

As mentioned above, a horizontal TV sync signal component of a composite sync signal (CSYNC) shown in FIG. 22 can be produced.

Figure 13:
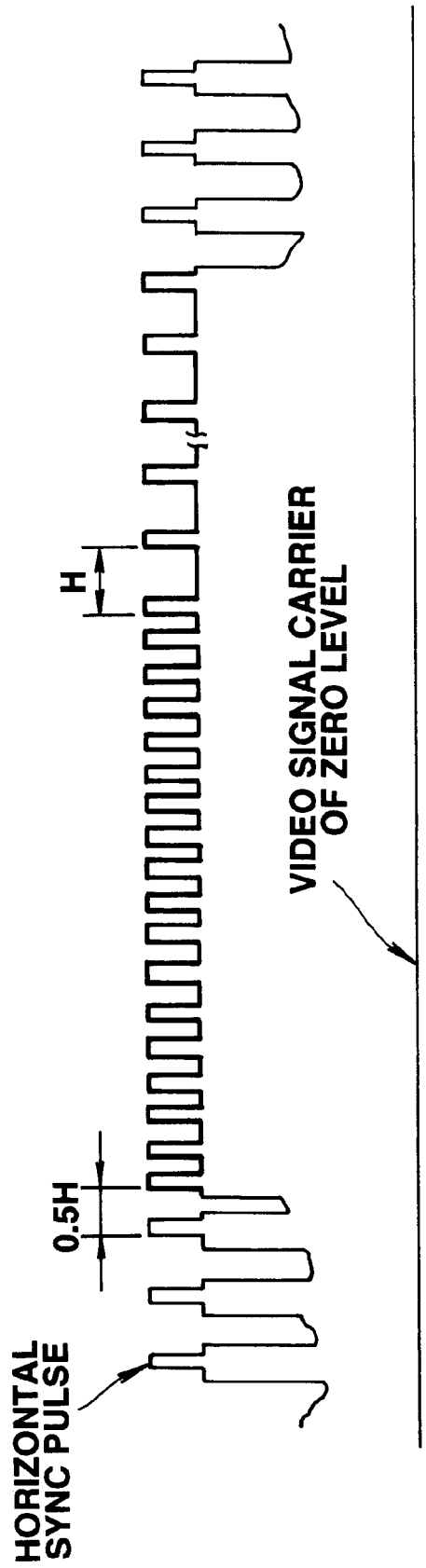
FIG. 13 is an explanatory diagram showing a vertical sync signal for the next field in the film scanner of the first embodiment.

Step S857 is a routine for generating a pulse train of a vertical sync signal depicted with a bold line in FIGS. 12 and 13. FIG. 12 shows a vertical sync signal for the first field, while FIG. 13 shows a vertical sync signal for the next field.

CCD exposure control (CCD shift gating) constructed as mentioned above is executed at the same position on each horizontal scanning line in a TV display screen as shown in FIG. 11, and will therefore not butt against TV display.

Thus, according to the aforesaid embodiments, a film scanner comprises an image input means including a CCD line sensor and the like, an A/D converting means for converting an image signal output from the image input means into a digital form, a memory means for storing a digital signal output from the A/D converting means, a D/A converting means for converting a digital signal output from the memory means into an analog form, an encoder means for outputting a video signal on the basis of an analog signal output from the D/A converting means, and a control means for controlling the respective means. In the film scanner, a CCD exposure time is controlled synchronously with output of a horizontal TV sync signal. The relationship between the timing of controlling TV display and the timing of exposing a CCD can be retained constant. A single controller can therefore provide the two kinds of control despite the relatively simple hardware and software configurations.

In this invention, it is apparent that a wide range of different working modes can be formed on the basis of this invention without a departure from the spirit and scope of the invention. This invention is not restricted to any specific embodiment but is limited only to the appended claims.

What is claimed is:

1. A film scanner enabling a television (hereinafter TV) display, comprising:
   a line sensor means for converting a one-dimensional optical image into a line image signal;
   an A/D converting means for converting said line image signal into a digital signal;
   an image memory means for storing said digital signal in units of a line image;
   a D/A converting means for converting a line image signal read from said image memory means into an analog video signal;
   a synchronizing (hereinafter sync) signal generating means for generating a sync signal used to produce an analog video signal;
   an encoder means for outputting a given video signal responsive to the analog signal output from said D/A converting means and said sync signal; and
   a control means for directly providing timing signals to the line sensor means, the A/D converting means to the exclusion of the synchronizing signal generating means and the D/A converting means and at the same time controlling at least accumulating of said line sensor means in response to a given timing of said sync signal and controlling writing or reading of said image memory means.

2. A film scanner according to claim 1, wherein said control means at least starts or terminates said accumulating of said line sensor means in response to said given timing of said sync signal, and said control means outputs a line image signal from said memory means and then reads an image signal from said line sensor means by a next given timing of said sync signal.

3. A film scanner according to claim 1, wherein said image memory means includes a dynamic RAM that needs to be refreshed during a given period, and said control means at least outputs a line image signal from said memory means in response to said given timing of said sync signal, then starts or terminates said accumulating of said line sensor means, refreshes said memory means, and reads an image signal from said line sensor means.

4. The film scanner of claim 1 wherein said control means comprises means for performing software routines to generate control signals controlling the receipt and storage of image data and time matching routines to match time intervals required to perform certain program steps so that each time matching interval is equal to an associated program step whereby instances where a program step is not performed, the time matching step is performed as an alternative thereto to assure proper timing throughout the routines.

5. The film scanner of claim 1 wherein said control means includes means for performing software routines for generating synchronizing signals for producing a TV display, thereby eliminating the need for conventional TV sync signal generating means.

6. The film scanner of claim 5 wherein said software routines are utilized to produce vertical and horizontal sync signals, vertical and horizontal blanking signals, computer sync signals and a sub-carrier signal.

7. A film scanner enabling TV display, comprising:
   an image input means including a line sensor;
   an A/D converting means for converting an image signal output from said image input means into a digital signal;
   a memory means for storing a digital signal output from said A/D converting means;
   a D/A converting means for converting a digital signal output from said memory means into an analog signal;
   an encoder means for converting an analog signal output from said D/A converting means into an analog video signal; and
   a control means for directly providing timing signals to the image input means, the A/D converting means and the D/A converting means to the exclusion of the synchronizing signal generating means and at the same time outputting digital image data from said memory means synchronously with a given timing of a horizontal TV sync signal, and reading said image input means during the outputting of a digital image from said memory means.

8. A film scanner enabling TV display, comprising:
   an image input means including a line sensor;
   an A/D converting means for converting an image signal output from said image input means into a digital signal;

a memory means for storing a digital signal output from said A/D converting means;

a memory means for storing a digital signal output from said A/D converting means;

a D/A converting means for converting a digital signal output from said memory means into an analog signal;

an encoder means for converting an analog signal output from said D/A converting means into an analog video signal; and a control means including a first control means for providing timing signals directly to the image input means, the A/D converting means and the D/A converting means to the exclusion of the synchronizing signal generating means and at the same time outputting digital image data from said memory means synchronously with a given timing of a horizontal TV sync signal and a second control means for starting or terminating an accumulating time of said image input means, said first control means operating while having priority over said second control means.

9. A film scanner enabling TV display, comprising:

an image input means including a line sensor;

an A/D converting means for converting and image signal output from said image input means into a digital signal;

a memory means for storing a digital signal output from said A/D converting means;

a D/A converting means for converting a digital signal output from said memory means into an analog signal;

an encoder means for converting an analog signal output from said D/A converting means into an analog video signal; and a control means for providing timing signals directly to the image input means, the A/D converting means and the D/A converting means to the exclusion of the synchronizing signal generating means and at the same time starting or terminating an accumulating tie of said image input means synchronously with a given timing of a horizontal TV sync signal, outputting line image signal data from said memory means, and after completing said outputting, reading said image input means until occurrence of a next pulse of a horizontal sync signal.

10. A film scanner enabling TV display, comprising:

an image input means including a line sensor;

an A/D converting means for converting an image signal output from said image input means into a digital signal;

a memory means for storing a digital signal output from said A/D converting means;

a D/A converting means for converting a digital signal output from said memory means into an analog signal;

an encoder means for converting an analog signal output from said D/A converting means into an analog video signal; and a means for providing timing signals directly to the image input means, the A/D converting means and the D/A converting means to the exclusion of the synchronizing signal generating means and at the same time starting or terminating an accumulating time of said image input means synchronously with a given timing of a horizontal TV sync signal, outputting line image data from said memory means, then refreshing said memory means, and reading said image input means.

11. A film scanner, comprising: an image input means including a line sensor means for optically reading an image and outputting an image signal;

an A/D converting means for converting said image signal into a digital signal;

a memory means for storing a digital signal converted by said A/D converting means;

a D/A converting means for converting a digital signal output from said memory means into an analog signal;

a video encoder means for outputting an analog video signal on the basis of an analog signal output from said D/A converting means; and a control means for providing timing signals directly to the line sensor means, the A/D converting means and the D/A converting means to the exclusion of the synchronizing signal generating means and at the same time controlling accumulating of said line sensor means in steps of a unit time that is a cycle of a given sync signal used to produce said video signal, controlling said memory means so as to output a stored signal from said memory means, and then after completing this processing, controlling said line sensor means so as to output an image signal from said line sensor means and store the image signal in said memory means.

12. A film scanner according to claim 11, further including a sync signal generating means for generating said given sync signal.

13. A film scanner according to claim 11, wherein said control means generates said given sync signal by itself.

14. A film scanner, comprising:

an image input means including a CCD line sensor means for optically reading an image and outputting an image signal;

an A/D converting means for converting said image signal into a digital signal;

a memory means for storing a digital signal converted by said A/D converting means;

a D/A converting means for converting a digital signal output from said memory means into an analog signal;

a video encoder means for outputting an analog video signal based on an analog signal output from said D/A converting means; and a control means for providing timing signals directly to the line sensor means, the A/D converting means and the D/A converting means to the exclusion of the synchronizing signal generating means and at the same time controlling at least an accumulating time of said CCD line sensor means based on a given sync signal contained in said video signal.

15. A film scanner according to claim 14, wherein said control means controls an accumulating time of said CCD line sensor means in steps or units of a cycle of said given sync signal.

16. A film scanner according to claim 14, wherein said control means generates said given sync signal, controls an accumulating time of said CCD line sensor means synchronously with said sync signal, and outputs a digital signal from said memory means.

17. A film scanner according to claim 14, wherein said control means generates said given sync signal, controls an accumulating time of said CCD line sensor means synchronously with said sync signal, outputs a digital signal from said memory means, and after completing this processing, outputs an image signal from said CCD line sensor means.

18. A film scanner enabling displaying on and outputting to a TV screen, comprising:

an image input means that includes a charge accumulation type line sensor device, which reads an optical image recorded on developed photographic film, and outputs a corresponding image signal;

a first signal converting means for converting said image signal into a digital signal;

a memory means for storing said digital signal;

a second signal converting means for converting a digital signal read from said memory means into an analog signal;

an encoder means for producing an analog video signal used for TV display responsive to an analog signal converted by said second signal converting means and a given sync signal; and a control means for providing timing signals to the image input means, the first signal converting means and the second signal converting means and at the same time controlling at least a timing of operating said charge accumulation type line sensor device, a timing of operating said memory means and a timing of operating said encoder means responsive to a given reference signal.

19. A film scanner according to claim 18, wherein said control means is a reduced instruction set computer.

20. A film scanner according to claim 18, wherein said given sync signal is a horizontal TV sync signal.

21. A film scanner according to claim 18, wherein said control means starts reading an image signal from said charge accumulation type line sensor device synchronously with a start timing of a horizontal TV sync signal.

22. A film scanner according to claim 18, further including a timing generating means for generating a signal that contains said horizontal TV sync signal and a reference signal and pulsates at intervals of a given time.

23. A film scanner enabling displaying on and outputting to a TV screen, comprising:

an image input means that includes a charge accumulation type line sensor device, which reads an optical image recorded on developed photographic film, and outputs a corresponding image signal;

a first signal converting means for converting said image signal into a digital signal;

a memory means for storing said digital signal;

a second signal converting means for converting a digital signal read from said memory means into an analog signal;

an encoder means for producing an analog video signal used for TV display responsive to an analog signal converted by said second signal converting means and a given sync signal; and a control means for providing timing signals directly to the image input means, the first signal converting means and the second signal converting means to the exclusion of the synchronizing signal generating means and at the same time generating a signal that contains a horizontal TV sync signal and pulsates at intervals of a given time, and controlling at least a timing of operating said charge accumulation type line sensor device, and a timing of operating said encoder means.

24. A film scanner, comprising:

an image input means including a CCD line sensor means for optically reading an image and outputting an image signal;

an A/D converting means for converting said image signal into a digital signal;

a memory means for storing a digital signal converted by said A/D converting means;

a video encoder means for outputting an analog video signal based on an analog signal output from said D/A converting means; and a control means for providing timing signals directly to the line sensor means, the A/D converting means and the D/A converting means to the exclusion of the synchronizing signal generating means and at the same time controlling at least reading of said CCD line sensor means based on a given sync signal contained in said video signal.

25. A film scanner enabling a television (hereinafter TV) display, comprising:

a line sensor means for converting a one-dimensional optical image into a line image signal;

an AID converting means for converting said line image signal into a digital signal;

an image memory means for storing said digital signal in units of a line image;

a D/A converting means for converting a line image signal read from said image memory means into an analog video signal;

a synchronizing (hereinafter sync) signal generating means for generating a sync signal used to produce an analog video signal;

an encoder means for outputting a given video signal responsive to the analog signal output from said D/A converting means and said sync signal; and a control means for exclusively providing timing signals directly to the line sensor means, the A/D converting means and the D/A to the exclusion of the sync signal generating means converting means and at the same time controlling at least accumulating of said line sensor means in response to a given timing of said sync signal and controlling writing or reading of said image memory means.

26. The film scanner of claim 25 wherein said control means is a single chip microcomputer.

27. The film scanner of claim 25 wherein said single chip is a RISC microcomputer.

* * * * *

UNITED STATES PATENT AND TRADEMARK OFFICE
CERTIFICATE OF CORRECTION

PATENT NO : 5,949,478
DATED : September 7, 1999
INVENTOR(S): Keiji Kunishige

It is certified that error appears in the above-identified patent and that said Letters Patent are hereby corrected as shown below:

At column 6, line 14, delete the word "TIM" and insert therefor --TIMφ--.

In claim 25, column 18, line 29, delete the work "AID" and insert therefor --A/D--.

Signed and Sealed this

Twenty-ninth Day of May, 2001

Attest:

NICHOLAS P. GODICI

*Attesting Officer*   *Acting Director of the United States Patent and Trademark Office*